(12) United States Patent
Katakura et al.

(10) Patent No.: US 8,216,110 B2
(45) Date of Patent: Jul. 10, 2012

(54) SHIFTING CONTROL SYSTEM

(75) Inventors: Shusaku Katakura, Fujisawa (JP);
Sadamu Fujiwara, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 904 days.

(21) Appl. No.: 12/272,853

(22) Filed: Nov. 18, 2008

(65) Prior Publication Data
US 2009/0145253 A1    Jun. 11, 2009

(30) Foreign Application Priority Data

Dec. 5, 2007  (JP) ................................. 2007-314396
Jul. 11, 2008  (JP) ................................. 2008-180852

(51) Int. Cl.
*B60W 10/02*  (2006.01)
*B60W 10/10*  (2012.01)

(52) U.S. Cl. ........................................................ 477/79

(58) Field of Classification Search ..................... 477/76, 477/79, 180
See application file for complete search history.

(56) References Cited

U.S. PATENT DOCUMENTS 5,997,433 A * 12/1999 Domian et al. ................ 477/98
7,740,558 B2 * 6/2010 Matsumura et al. ........... 477/79

2004/0112171 A1    6/2004  Kuhstrebe et al.
2005/0261108 A1   11/2005  Kuhstrebe et al.
2009/0036265 A1 *  2/2009  Hwang et al. ................ 477/76

FOREIGN PATENT DOCUMENTS

| DE | 10148424 A1 | 7/2002 |
| EP | 1398519 A2 | 3/2004 |
| JP | 2007-002926 | 1/2007 |
| WO | WO-02055903 A2 | 7/2002 |

OTHER PUBLICATIONS

The extended European search report for corresponding European Patent Application No. 08170651.7, dated Aug. 11, 2011.

* cited by examiner

*Primary Examiner* — Edwin A Young
(74) *Attorney, Agent, or Firm* — Global IP Counselors, LLP

(57) ABSTRACT

A shifting control system has two gear shift stage groups, two clutches, a clutch release detection section, a pre-shift controller, a clutch oil level detection section and a pre-shift inhibiting section. The clutches are alternately engaged to selectively transmit power from an engine to a wheel. The clutch release detection section detects a release-side clutch which corresponds to the clutch that is in a released state. The pre-shift controller operates a meshing mechanism of the gear shift stage group corresponding to the release-side clutch, so as to undergo pre-shifting when the other clutch is engaged as an engage-side clutch. The clutch oil level detection section determines whether an oil level in the release-side clutch is equal to or greater than a preset oil level. The pre-shift inhibiting section inhibits pre-shifting while the oil level in the release-side clutch is equal to or greater than a preset oil level.

10 Claims, 7 Drawing Sheets

SHIFTING CONTROL SYSTEM

CROSS-REFERENCE TO RELATED APPLICATIONS

This application claims priority to Japanese Patent Application No. 2007-314396 filed on Dec. 5, 2007 and Japanese Patent Application No. 2008-180852 filed on Jul. 11, 2008. The entire disclosures of Japanese Patent Application Nos. 2007-314396 and 2008-180852 are hereby incorporated herein by reference.

BACKGROUND OF THE INVENTION

1. Field of the Invention

The present invention generally relates to a shifting control system for a clutch-type automatic transmission, specifically, a twin clutch-type automatic transmission. More specifically, the present invention relates to a technology for appropriately carrying out pre-shifting in which a selective meshing mechanism is made to undergo advance shifting that governs implementation of a gear shift stage in one gear shift stage group, while a gear shift stage in another gear shift stage group is engaged.

2. Background Information

When a manual transmission is to be converted to an automatic transmission and a clutch-type automatic transmission is produced, as described in Laid-Open Patent Publication (Kokai) No. 2007-002926, for example, a configuration has been used in which the gear shift stages are separated into a plurality of gear shift stage groups (normally, two gear shift stage groups: an even gear shift stage group and an odd gear shift stage group), and a clutch is provided for each gear shift stage group, so that a rotation can be input to each from a drive mechanism such as an engine. With these types of twin clutch-type automatic transmissions, a condition is produced in which power transmission is possible by the gear shift stage due to the shifting action of the selected meshing mechanism governing implementation of the gear shift stage in a first gear shift stage group, along with engagement of the corresponding clutch. Thus, during implementation of this gear shift stage, with the clutch for the second gear shift stage group in a released state, the selected meshing mechanism that governs implementation of the gear shift stage in the second gear shift stage group (the gear shift stage that is anticipated to be subsequently selected) is made to undergo an advance shifting action (pre-shifting), so that shifting can be carried out only by switching between the two clutches.

In Japanese Laid-Open Patent Publication (Kokai) No. 2007-002926 that relates to this pre-shifting, a shifting control technology for a twin clutch-type automatic transmission is disclosed in which if the release-side clutch in the second gear shift stage group is in a released state, pre-shifting is carried out in the second gear shift stage group, regardless of the engaged state of the engage-side clutch in the first gear shift stage group.

In view of the above, it will be apparent to those skilled in the art from this disclosure that there exists a need for an improved shifting control system. This invention addresses this need in the art as well as other needs, which will become apparent to those skilled in the art from this disclosure.

SUMMARY OF THE INVENTION

It has been discovered that in the above technology that pre-shifting of the gear shift stage group for the release-side clutch is allowed unconditionally when the release-side clutch is in a released state. This results in several problems when the engage-side clutch is in a slip engagement state a rotational difference between exists the input and output of the clutch. Specifically, when the clutch is in a released state or a completely engaged state, slippage does not occur, no heat is generated, and there is no need for cooling. However, when slip engagement occurs, a rotational difference exists between the input and output of the clutch. Thus, during slip engagement, cooling of the clutch is necessary in order to prevent combustion damage to the clutch due to heat generation or early degradation due to excessive heating of the operating oil.

Lubricating oil is provided to the clutch undergoing slip engagement to cool the clutch. Regarding the lubricating oil level of the clutch, an estimate is made of the amount of heat generation at the clutch which is determined by the clutch input torque or the clutch slip rotation. This clutch lubricating oil level is typically increased as the amount of heat generation at the clutch increases. The clutch is thus cooled to a degree whereby problems with combustion damage or overheating of the hydraulic oil do not occur. Consequently, based on conditions in which the engage-side clutch undergoes an increase in heat generation, the clutch lubricating oil used for cooling the clutch is supplied in a greater amount to match the amount of heat generation of the engage-side clutch.

On the other hand, in terms of the clutch cooling system, transmission operating oil is cooled by an oil cooler, and then the transmission operating oil is supplied to each of the clutches. This cooled transmission operating oil can be supplied by a clutch lubricating oil channel that is shared by both clutches. This arrangement provides cooling to both clutches via the lubricating oil. Alternatively, this cooled transmission operating oil is supplied separately to each of the clutches via a separate clutch lubricating oil channel for each of the clutches. This arrangement provides separate control of the lubricating oil amount for each of the clutches. With the former clutch cooling system using a shared clutch lubricating oil channel, and, even with the latter clutch cooling system using separately clutch lubricating oil channels to each of the clutches, when a large volume of lubricating oil is supplied to the engage-side clutch, the lubricating oil from the large volume that is supplied to the engaging-side clutch is also distributed towards the release-side clutch because the respective clutches are in close proximity to each other with twin clutch type automatic transmission configurations.

For this reason, a large amount of lubricating oil is supplied to all of the clutches under operating conditions in which a large amount of heat is generated at the engage-side clutch. Also, under operating conditions involving a large amount of clutch heat generated on the engagement side that does not participate in pre-shifting, a large amount of lubricating oil is also supplied to the release-side clutch, which is in a released state, and participates in pre-shifting. When a large amount of lubricating oil is supplied to the pre-shift-side (release-side) clutch that is in a released state in this manner, a large amount of lubricating oil is continually introduced between the clutch disks that are separated from each other on the pre-shift-side (release-side) clutch. This can result in drag torque on the pre-shift-side (release-side) clutch being transmitted to the related synchronous meshing mechanism via the introduced lubricating oil. This clutch drag torque makes it difficult to synchronize the forward and reverse rotation of the synchronous meshing mechanism participating in the aforementioned pre-shifting. As a result, this pre-shifting becomes difficult or impossible.

There thus arises the problem that shifting itself that occurs via this pre-shifting becomes difficult or impossible, as well as the problem that the synchronous meshing mechanism is damaged by unnatural and forced synchronous action, reducing durability.

As with the conventional technology described above, the above-described types of problems arise with shifting control systemes for twin clutch-type automatic transmissions that allow pre-shifting of a gear shift stage group related to the clutch when this release-side clutch is in a released state unconditionally. In other words, given a condition in which there is a large amount of heat generated by the engage-side clutch, a large amount of clutch lubricating oil for cooling is directed to the release-side clutch as well, unavoidably leading to the problem that pre-shifting is difficult or impossible or problems with damage to the synchronous meshing mechanism and decreasing durability. When there is a large amount of oil at the release-side clutch for the reasons indicated above, drag torque is produced at a level wherein the above-described pre-shifting is obstructed by the oil inside release-side clutch, in spite of the fact that the clutch is in a completely released state. In such a case, pre-shifting becomes difficult or impossible, leading to damage to the synchronous meshing mechanism or a loss of durability, and produces no advantageous result. It was accordingly concluded that pre-shifting should be inhibited.

An object of the present invention is to provide a shifting control system for a twin clutch-type automatic transmission that responds to the above-described problems by developing this concept.

In order to attain this object, an aspect of the shifting control system for a twin clutch-type automatic transmission is provided that basically comprises a first gear shift stage group, a second gear shift stage, a first clutch, a second clutch, a clutch release detection section, a pre-shift controller, a clutch oil level detection section and a pre-shift inhibiting section. The first gear shift stage group includes a plurality of gear shift stages. The second gear shift stage group includes a plurality of gear shift stages. The first clutch is operatively coupled to the first gear shift stage group to selectively transmit power from an engine to a wheel. The second clutch is operatively coupled to the second gear shift stage group to selectively transmit power from the engine to the wheel. The clutch release detection section is configured to detect a release-side clutch which corresponds to one of the first and second clutches that is in a released state. The pre-shift controller is arranged to operate a meshing mechanism of one of the first and second gear shift stage groups, which is to be connected to the engine by the release-side clutch, so as to undergo pre-shifting when the other of the first and second clutches is engaged as an engage-side clutch. The clutch oil level detection section is configured to determine whether an oil level in the release-side clutch is equal to or greater than a preset oil level. The pre-shift inhibiting section is configured to inhibit pre-shifting while the oil level in the release-side clutch is equal to or greater than a preset oil level.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 5 is an oil pressure circuit diagram showing the shifting control system for the twin clutch-type automatic transmission shown in FIG. 2 in a state in which the sequence solenoid used in the system is ON;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
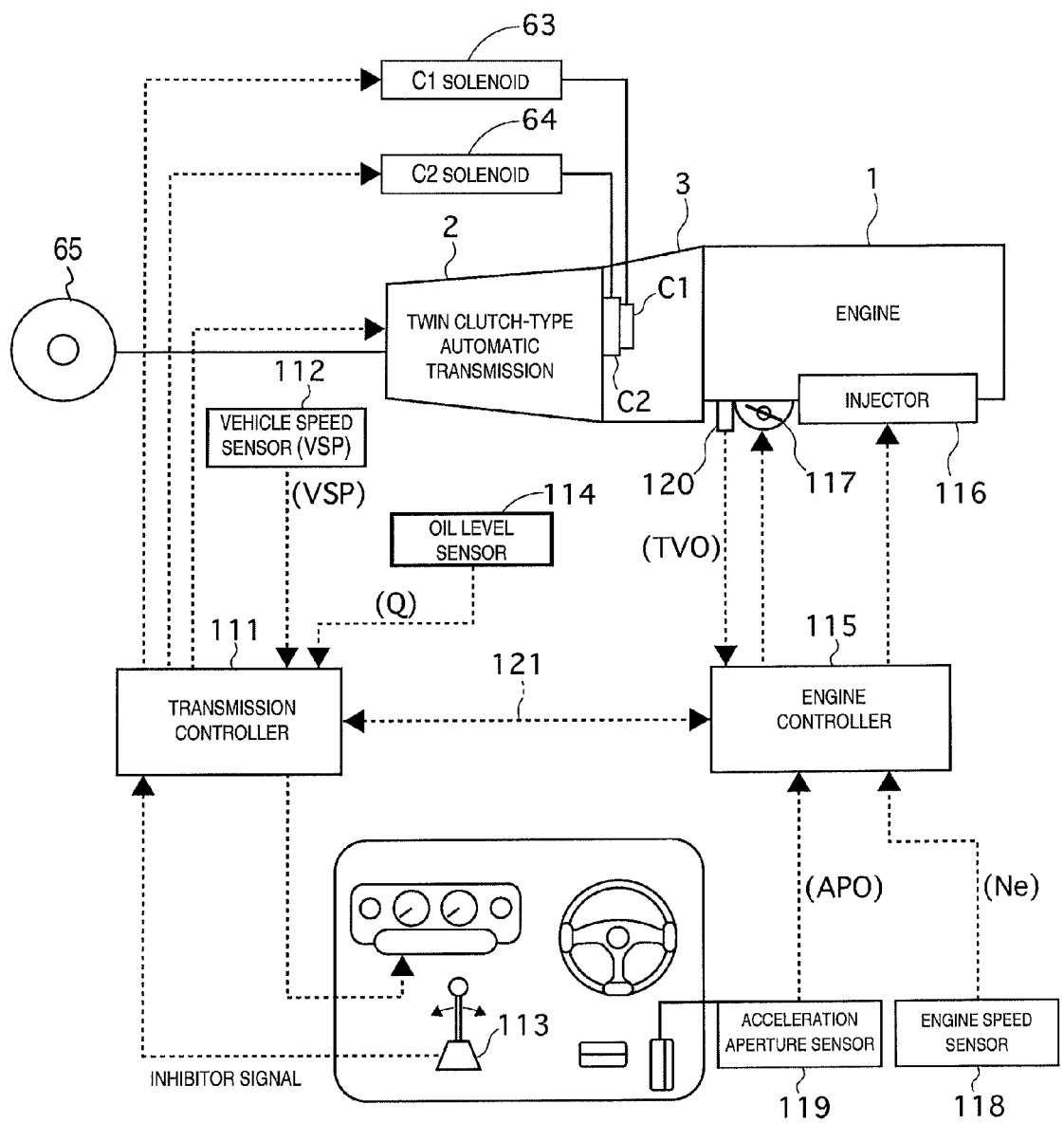
FIG. 1 is a system diagram schematically illustrating a vehicle power train including a twin clutch-type automatic transmission that can utilize a shifting control system according to one embodiment.
Figure 2:
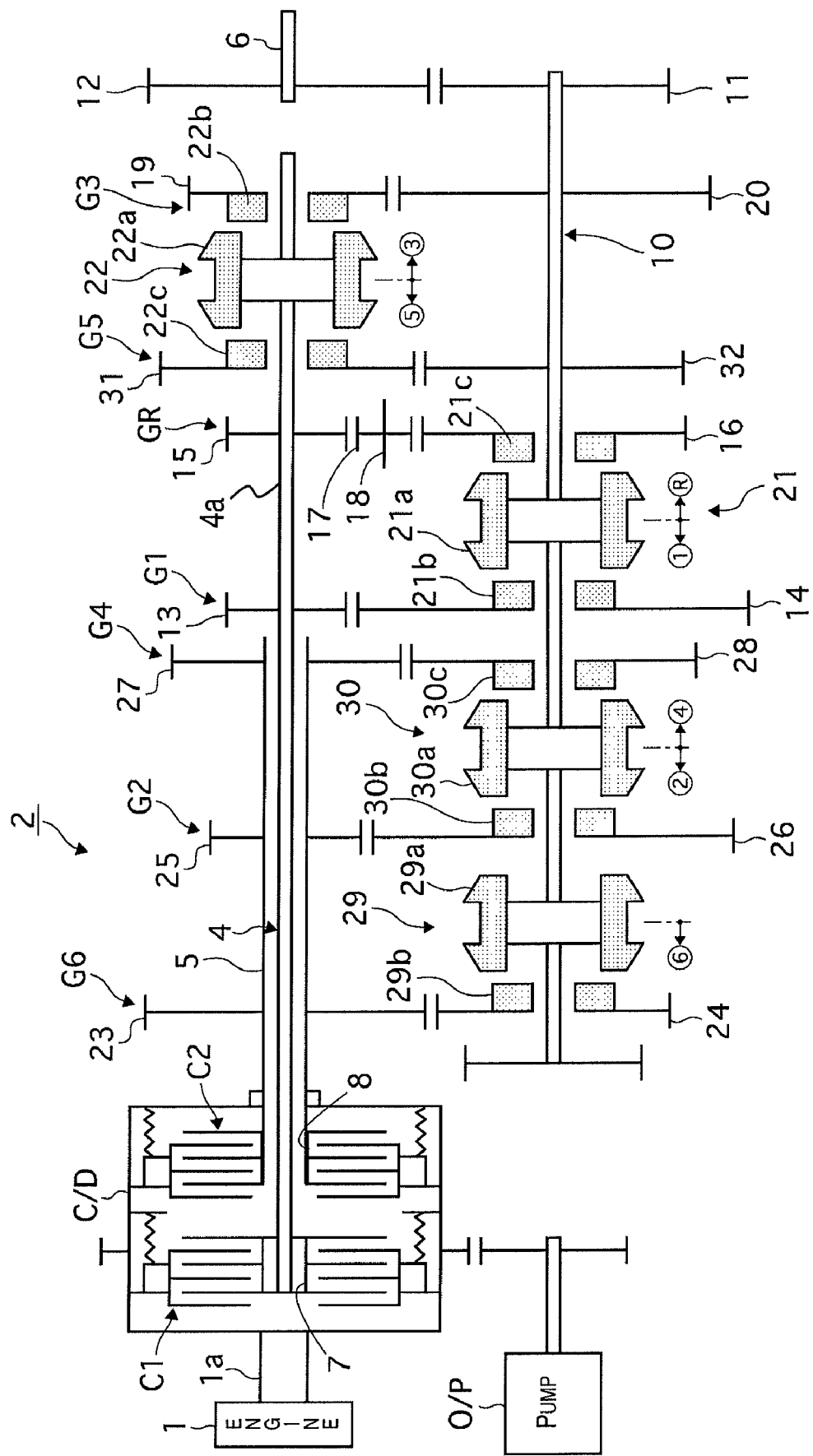
FIG. 2 is a schematic diagram of main components of the twin clutch-type automatic transmission in FIG. 1.

Referring initially to FIG. 1, a vehicle power train and control system are schematically illustrated in accordance with a first embodiment. The vehicle power train includes an engine 1 and a twin clutch-type automatic transmission 2 that is equipped with the shifting control system. FIG. 2 is a diagram of some main components of the twin clutch-type automatic transmission. As seen in FIG. 2, an output shaft or crankshaft 1a of the engine 1 is selectively linked to a first input shaft 4 and a second input shaft 5 by a pair of automatic wet rotary clutches C1 and C2, respectively. The clutches C1 and C2 are disposed inside a clutch housing 3. When the clutch C1 is engaged and the clutch C2 is released to connect the crankshaft 1a to the first input shaft 4, one of a plurality of odd-numbered gear shift stages (first speed, third speed, fifth speed, reverse) of the twin clutch-type automatic transmission 2 are attained. When the clutch C2 is engaged and the clutch C1 is released to connect the crankshaft 1a to the second input shaft 5, one of a plurality of even-numbered gear shift stages (second speed, fourth speed and sixth speed) are attained. An output shaft 6 of the twin clutch-type automatic transmission 2 is linked to a pair of drive wheels 65 via a propeller shaft and a differential gear mechanism not shown in the drawings.

To describe in detail the twin clutch-type automatic transmission 2 based on FIG. 2, the output shaft or crankshaft 1a of the engine 1 is drivably linked to a clutch drum C/D. The clutch drum C/D is shared by the automatic wet rotary clutch C1 for the odd-numbered gear shift stages (first speed, third speed, fifth speed, reverse) and the automatic wet rotary clutch C2 for the even-numbered stages (second speed, fourth speed and sixth speed). As described above, the twin clutch-type automatic transmission has the first input shaft 4 for the odd-numbered gear shift stages (first speed, third speed, fifth speed, reverse) and the second input shaft 5 for the even-numbered gear shift stage (second speed, fourth speed and sixth speed), with the first and second input shafts 4 and 5 each being linked to one of a pair of clutch hubs 7 and 8 of the individual clutches C1 and C2, respectively. Thus, rotation of the engine output shaft 1a can be selectively inputted to the first input shaft 4 via the odd-numbered gear shift stage clutch C1 and to the second input shaft 5 via the even-numbered gear shift stage clutch C2.

The gear shifting mechanism of the twin clutch-type automatic transmission will now described in detail below. The second input shaft 5 is a hollow tubular shaft that fits over the first input shaft 4. The first (inner) input shaft 4 and the second (outer) input shaft 5 are arranged to freely rotate concentrically with respect to each other. Of the first input shaft 4 and the second input shaft 5 that are fitted together so that they rotate as described above, the rear end of the first input shaft 4 that is distant from the clutch hub 7 protrudes from the rear end of the second input shaft 5. A rear end extension part 4a can be provided on the rear end of the first input shaft 4. A counter shaft 10 is provided parallel to the first input shaft 4, the second input shaft 5 and the output shaft 6.

A counter gear 11 is fixed on the rear end of the counter shaft 10 for integrated rotation. An output gear 12 is disposed on the same axially orthogonal plane. The output gear 12 is fixed to the output shaft 6. The counter gear 11 and the output gear 12 are meshed together so that the counter shaft 10 is drivably linked to the output shaft 6.

A gear group GR is provided between the rear end extension 4a of the first input shaft 4 and the counter shaft 10 for providing a reverse gear shift stage. Gear groups G1, G3, G5 are provided between the rear end extension 4a of the first input shaft 4 and the counter shaft 10 for providing the odd-numbered gear shift stages ($1^{st}$, $3^{rd}$ and $5^{th}$). The first speed gear group G1, the reverse gear group GR, the $5^{th}$ speed gear group G5 and the 3rd speed gear group G3 are disposed sequentially starting from the front side near the engine 1.

The first speed gear group G1 includes a first speed input gear 13 and a first speed output gear 14. The first speed input gear 13 is fixed with the rear end extension part 4a of the first input shaft 4, while the first speed output gear 14 is rotatably provided on the counter shaft 10. The first speed input gear 13 meshes with the first speed output gear 14 for transferring rotation from the first input shaft 4 to the counter shaft 10.

The reverse gear group GR includes a reverse input gear 15, a reverse output gear 16 and a reverse idler gear 17. The reverse input gear 15 is fixed with the rear end extension part 4a of the first input shaft 4, while the reverse output gear 16 is rotatably provided on the counter shaft 10. The reverse idler gear 17 meshes with the gears 15 and 16, and is drivably linked under reverse rotation between the gears 15 and 16. Thus, the reverse input gear 15 meshes with the reverse idler gear 17 which in turn meshes with first speed output gear 14 for transferring rotation from the first input shaft 4 to the counter shaft 10 with a reverse rotation. The reverse idler gear 17 is rotatably supported on a reverse idler shaft 18 that is fixed to the transmission case.

The third gear group G3 includes a third speed input gear 19 and a third speed output gear 20. The third speed input gear 19 is rotatably provided on the rear end extension part 4a of the first input shaft 4, while the third speed output gear 20 is fixed with the counter shaft 10. The third speed input gear 19 meshes with the third speed output gear 20 for transferring rotation from the first input shaft 4 to the counter shaft 10.

The fifth speed gear group G5 includes a fifth speed input gear 31 and a fifth speed output gear 32. The fifth speed input gear 31 is rotatably provided on the rear end extension part 4a of the first input shaft 4, while the fifth speed output gear 32 is fixed with the counter shaft 10. The fifth speed input gear 31 meshes with the fifth speed output gear 32 for transferring rotation from the first input shaft 4 to the counter shaft 10.

A first speed-reverse synchronous meshing mechanism (selective meshing mechanism) 21 is also provided to the counter shaft 10 between the first speed output gear 14 and the reverse output gear 16. The first speed-reverse synchronous meshing mechanism 21 includes a coupling sleeve 21a fixed to the counter shaft 10, a clutch gear 21b fixed to the first speed output gear 14 and a coupling sleeve 21c fixed to the reverse output gear 16. In particular, the first speed output gear 14 is drivably linked to the counter shaft 10 when the coupling sleeve 21a of first speed-reverse synchronous meshing mechanism 21 is moved to the left from a center neutral position in FIG. 2, and meshes with the clutch gear 21b. The reverse output gear 16 is drivably linked to the counter shaft 10 when the coupling sleeve 21a is moved to the right from the center neutral position in FIG. 2, and meshes with the clutch gear 21c. The first speed-reverse synchronous meshing mechanism 21 allows implementation of the first speed and the reverse gear as described below.

In addition, a third speed-fifth speed synchronous meshing mechanism (selective meshing mechanism) 22 is also provided between the third speed input gear 19 and the fifth speed input gear 31 on the extension part 4a of the first input shaft 4. The third speed-fifth speed synchronous meshing mechanism 22 includes a coupling sleeve 22a fixed to the extension part 4a, a clutch gear 22b fixed to the third speed input gear 19 and a coupling sleeve 22c fixed to the fifth speed input gear 31. In particular, the third speed input gear 19 is drivably linked to the first speed input shaft 4 when the coupling sleeve 22a that rotates together with the first input shaft 4 (rear end extension part 4a thereof) is moved to the right from a center neutral position in FIG. 2, and meshes with the clutch gear 22b. The fifth speed input gear 31 is drivably linked to the first input shaft 4 when the coupling sleeve 22a is moved to the left from the center neutral position in FIG. 2, and meshes with the clutch gear 22c. This third speed-fifth speed synchronous meshing mechanism 22 allows implementation of the third speed and also allows implementation of the fifth speed as described below.

The gear groups of the even-numbered gear shift stages (second speed, fourth speed and sixth speed) are disposed between the second input shaft 5 and the counter shaft 10. Specifically, the sixth speed gear group G6, the second speed gear group G2 and the fourth speed gear group G4 are provided sequentially starting from the front side nearest to the engine. The sixth speed gear group G6 is disposed in front relative to the second input shaft 5, the fourth speed gear group G4 is disposed to the rear of the second input shaft 5, and the second speed gear group G2 is disposed in the middle between the front part and rear end of the second input shaft 5.

The sixth speed gear group G6 includes a sixth speed input gear 23 and a sixth speed output gear 24. The sixth speed input gear 23 is fixed with the outer circumference of the second input shaft 5, while the sixth speed output gear 24 is rotatably provided on the counter shaft 10. The sixth speed input gear 23 meshes with the sixth speed output gear 24 for transferring rotation from the second input shaft 5 to the counter shaft 10.

The second speed gear group G2 includes a second speed input gear 25 and a second speed output gear 26. The second speed input gear 25 is fixed with the outer circumference of the second input shaft 5, while the sixth speed output gear 24 is rotatably provided on the counter shaft 10. The second speed input gear 25 meshes with the sixth speed output gear 24 for transferring rotation from the second input shaft 5 to the counter shaft 10.

The fourth speed gear group G4 includes a fourth speed input gear 27 and a fourth speed output gear 28. The fourth speed input gear 27 is fixed with the outer circumference of the second input shaft 5, while the fourth speed output gear 28 is rotatably provided on the counter shaft 10. The fourth speed input gear 27 meshes with the fourth speed output gear 28 for transferring rotation from the second input shaft 5 to the counter shaft 10.

A sixth speed dedicated synchronous meshing mechanism (selective meshing mechanism) 29 is also provided on the counter shaft 10 between the sixth speed output gear 24 and the second speed output gear 26. The sixth speed dedicated synchronous meshing mechanism 29 includes a coupling sleeve 29a fixed to the counter shaft 10 and a clutch gear 29b fixed to the sixth speed output gear 24. In particular, the sixth speed output gear 24 is drivably linked to the second speed input shaft 5 when the coupling sleeve 29a that rotates together with the counter shaft 10 is moved to the left from the center neutral position in FIG. 2 and meshes with the clutch gear 29b. The sixth speed dedicated synchronous meshing mechanism 29 allows implementation of the sixth speed as described below.

In addition, a second-fourth speed synchronous meshing mechanism (selective meshing mechanism) 30 is provided on the counter shaft 10 between the second speed output gear 26 and the fourth speed output gear 28. The second-fourth speed synchronous meshing mechanism 30 includes a coupling sleeve 30a fixed to the counter shaft 10, a clutch gear 30b fixed to the second speed output gear 26 and a clutch gear 30c fixed to the fourth speed output gear 28. In particular, the second speed output gear 26 is drivably linked to the second speed input shaft 5 when the coupling sleeve 30a that rotates together with the counter shaft 10 is moved to the left from the center neutral position in FIG. 2, and meshes with the clutch gear 30b. The fourth speed output gear 28 is drivably linked with the counter shaft 10 when the coupling sleeve 30a is moved to the right from the center neutral position in FIG. 2, and meshes with the clutch gear 30c. The second-fourth speed synchronous meshing mechanism 30 allows implementation of second speed and also allows implementation of the fourth speed as described below.

The automatic shifting action of the twin clutch-type automatic transmission of the above-described examples is described below.

Non-Travel Range

In the non-travel range such as the neutral (N) range or park (P) range during which drive transfer is not desired, both the automatic wet rotational clutches C1 and C2 are in a released state, and the coupling sleeves 21a, 22a, 29a, 30a of the synchronous meshing mechanisms 21, 22, 29 and 30 are all in the neutral position in FIG. 2. Thus, this situation produces a neutral condition in which the twin clutch-type automatic transmission is not transferring drive. In the park (P) range, the transmission output shaft 6 is also locked mechanically by a park lock device so that it cannot rotate.

Travel Range

In the travel ranges such as the D range in which forward power transmission is desired or in the R range in which reverse power transmission is desired, operating oil from the oil pump O/P (refer to FIG. 2) driven by the engine 1 is used as a medium, and, along with shifting action of the coupling sleeves 21a, 22a, 29a and 30a of the synchronous meshing mechanisms 21, 22, 29 and 30 as described below. Thus, implementation of each forward gear shift stage or reverse gear shift stage can be carried out by controlling engagement and release of the clutches C1 and C2.

D Range—First Speed

When the first speed is desired in the forward travel range within the D range, the coupling sleeve 21a of the synchronous gear mechanism 21 is moved to the left, and the gear 14 is drivably linked with the counter shaft 10. After thereby pre-shifting to the first speed of the odd-numbered gear shift stage group, the automatic wet rotary clutch C1 that has been in a released state in the non-travel range is engaged. Engine rotation is thus output from the clutch C1 to the output shaft 6 via the first input shaft 4, the first speed gear group G1, the counter shaft 10, and the output gear groups 11 and 12, thereby allowing power transmission in the first speed.

When the aforementioned implementation of the first speed is used to start the vehicle moving, the movement is started out smoothly without shock by slip engagement control that allows progressive engagement of the clutch C1. When the first speed is established in response to an operation for moving the selection from the N range to the D range, simultaneous to pre-shifting of the odd-numbered gear shift stage group to the first speed, the coupling sleeve 30a of the synchronous meshing mechanism 30 is moved to the left, and the gear 26 is made to drivably engage with the counter shaft 10. This completes pre-shifting of the even-numbered gear shift stage group to the second speed. However, because the clutch C2 persists in a released state in the non-travel range, the second speed is not implemented.

D Range—Second Speed

When up-shifting from the first speed to the second speed, with the even-numbered gear shift stage group being pre-shifted to the second speed as described above by switching the selector from N to D, as the clutch C1 is made to release, the clutch C2 that has been in a released state in the non-travel range is made to undergo progressive engagement (slip engagement control). This allows upshifting from the first speed to the second speed by switching of the two clutches C1 and C2. Engine rotation from the clutch C2 is thereby output from the output shaft 6 via the second input shaft 5, the second speed gear group G2, the counter shaft 10, and the output gear groups 11 and 12. This allows power transmission in the second speed.

Upon completion of shifting from the first speed to the second speed as described above, the coupling sleeve 22a of the synchronous meshing mechanism 22 is moved to the right, the gear 19 is drivably linked to the first input shaft 4, and pre-shifting of the odd-numbered gear shift stage group from the first speed to the third speed is carried out.

D Range—Third Speed

When upshifting from the second speed to the third speed, the odd-numbered gear shift stage group is pre-shifted to third speed as described above when upshifting from the first speed to the second speed. Thus, as the clutch C2 is released, the clutch C1 that has been in a released state in second speed is made to undergo progressive engagement (slip engagement control), allowing upshifting from the second speed to the third speed to occur by switching of the two clutches C1 and C2. Engine rotation from the clutch C1 is thereby output from the output shaft 6 via the first input shaft 4, the third speed gear group G3, the counter shaft 10, and the output gear groups 11 and 12. This allows power transmission to occur in the third speed.

Upon completion of shifting from the second speed to the third speed described above, the coupling sleeve 30a of the synchronous meshing mechanism 30 is made to return to the neutral position and the gear 26 separates from the counter shaft 10 as the coupling sleeve 30a of the synchronous meshing mechanism 30 is moved to the right. The gear 28 is drivably linked to the counter shaft 10, thereby carrying out pre-shifting of the even-numbered gear shift stage group from the second speed to the fourth speed.

D Range—Fourth Speed

When upshifting from the third speed to the fourth speed, the odd-numbered gear shift stage group is pre-shifted to the fourth speed as described above during upshifting from the second speed to the third speed. Thus, as the clutch C1 is released, the clutch C2 that has been in a released state in the third speed is made to undergo progressive engagement (slip engagement control). This allows upshifting from the third speed to the fourth speed to occur by switching of the two clutches C1 and C2. Engine rotation from the clutch C2 is thereby output from the output shaft 6 via the second input shaft 5, the fourth speed gear group G4, the counter shaft 10, and the output gear groups 11 and 12. This allows power transmission in the fourth speed.

Upon completion of shifting from the third speed to the fourth speed described above, the coupling sleeve 22a of the synchronous meshing mechanism 22 is made to return to the neutral position, and the gear 19 separates from the first input shaft 4 as the coupling sleeve 22a of the synchronous meshing mechanism 22 is moved to the left. The gear 31 is thus linked to the first input shaft 4, thereby carrying out pre-shifting of the odd-numbered gear shift stage group from the third speed to the fifth speed.

D Range—Fifth Speed

When upshifting from the fourth speed to the fifth speed, the odd-numbered gear shift stage group is pre-shifted to the fifth speed as described above when upshifting from third to fourth speed. Thus, as the clutch C2 is released, the clutch C1 that has been in a released state in the fourth speed is made to undergo progressive engagement (slip engagement control). This allows upshifting from the fourth speed to the fifth speed to occur by switching of the two clutches C1 and C2. Engine rotation from the clutch C1 is thereby output from the output shaft 6 via the first output shaft 4, the fifth speed gear group G5, the counter shaft 10, and the output gear groups 11 and 12. This allows power transmission in the fifth speed.

Upon completion of shifting from the fourth speed to the fifth speed described above, the coupling sleeve 30a of the synchronous meshing mechanism 30 is made to return to the neutral position, and the gear 28 separates from the counter shaft 10 as the coupling sleeve 29a of the synchronous meshing mechanism 29 is moved to the left. The gear 24 is thus drivably linked to the counter shaft 10, thereby carrying out pre-shifting of the even-numbered gear shift stage group from the fourth speed to the sixth speed.

D Range—Sixth Speed

When upshifting from the fifth speed to the sixth speed, the even-numbered gear shift stage group is pre-shifted to the sixth speed as described above when upshifting from fourth to fifth speed. Thus, as the clutch C1 is released, the clutch C2 that has been in a released state in fifth speed is made to undergo progressive engagement (slip engagement control). This allows upshifting from fifth to sixth speed to occur by switching of the two clutches C1 and C2. Engine rotation from the clutch C2 is thereby output from the output shaft 6 via the second input shaft 5, the sixth speed gear group G6, the counter shaft 10, and the output gear groups 11 and 12. This allows power transmission in the sixth speed.

Only downshifting is possible after shifting from the fifth speed to the sixth speed in this manner, and, because the odd-numbered gear shift stage group should be in a pre-shifted condition to the fifth speed, the coupling sleeve 22a of the synchronous meshing mechanism 22 is held in a leftward position as when implementing the fifth speed, thereby leaving the gear 31 linked to the first input shaft 4.

When downshifting from the sixth speed sequentially to the first speed, the prescribed downshifts are carried out by reversing shifting control relative to the upshifts described above; specifically, by controlling pre-shifting and controlling engagement and release of the clutches C1 and C2 in a sequence that is the reverse of that described above.

R Range

When reverse travel is desired, and the non-travel range is switched to the R range, the coupling sleeve 21a of the synchronous meshing mechanism 21 is moved to the right from the neutral position, and the gear 16 is drivably linked to the counter shaft 10. Thus, this pre-shifts the odd-numbered gear shift stage group to the reverse gear shift stage and engages the automatic wet rotational clutch C1 that has been in a released state in the non-travel range. Engine rotation from the clutch C1 is thereby output from the output shaft 6 via the first input shaft 4, the reverse gear group GR, the counter shaft 10, and the output gear groups 11 and 12. At this time, because the rotational direction from the reverse gear group GR is reversed, power transfer can be carried out by the reverse gear shift stage. When the vehicle starts moving in the reverse gear shift stage, the movement is started in reverse smoothly without the starting shock by enacting slip engagement control whereby the clutch C1 is made to undergo progressive engagement.

The release and engagement of the clutches C1 and C2 in the twin clutch-type automatic transmission 2 is controls by operating a first (odd-numbered gear shift stage) clutch solenoid 63 and a second (even-numbered gear shift stage) clutch solenoid 64 Controlling the release of engagement of the clutches C1 and C2 in the twin clutch-type automatic transmission 2 occurs progressively by the first and second clutch solenoids 63 and 64 as described below in reference to FIGS. 4 and 5.

Figure 4:
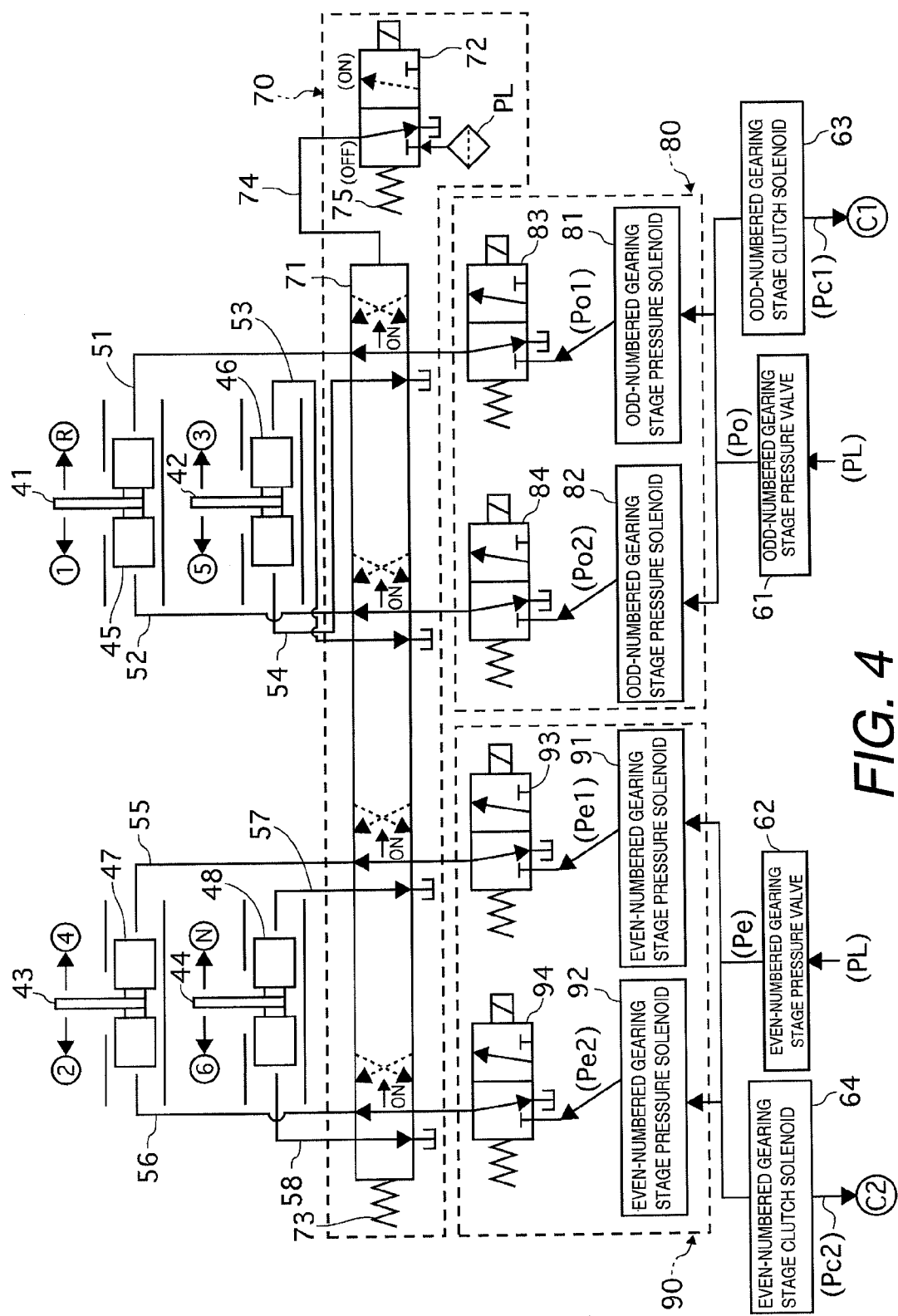
FIG. 4 is an oil pressure circuit diagram showing the shifting control system for the twin clutch-type automatic transmission shown in FIG. 2 in a state in which the sequence solenoid used in the system is OFF.
Figure 5:
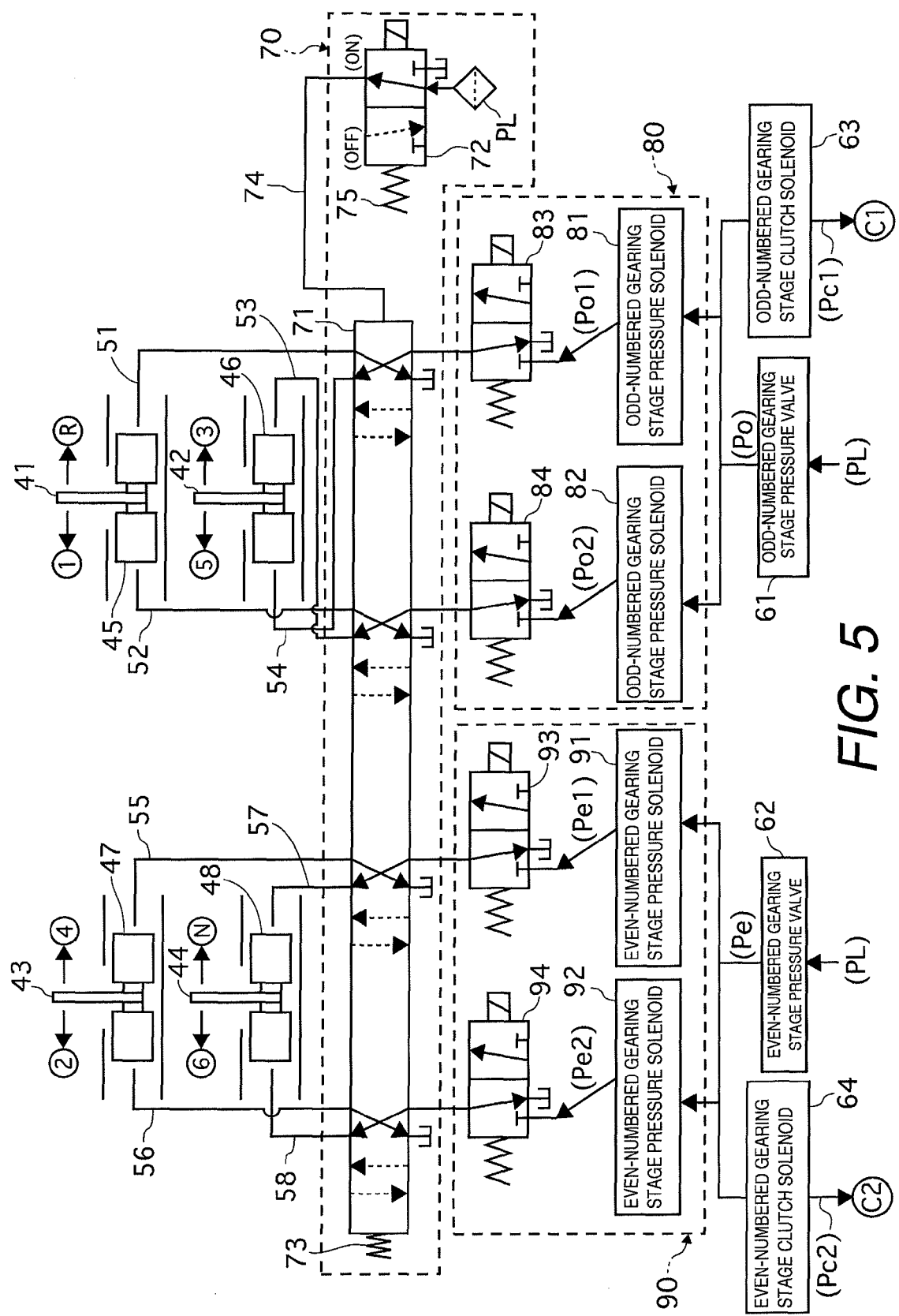

In addition, stroke control (shift control) of the coupling sleeves 21a, 22a, 29a and 30a that constitute the synchronous meshing mechanisms 21, 22, 29 and 30 is carried out by shift actuators 45, 46, 48 and 47 of the twin clutch-type automatic transmission 2 as shown in FIGS. 4 and 5. Shifting control of the twin clutch-type automatic transmission 2 via the shift actuators 45, 46, 48 and 47 (FIGS. 4 and 5) and the clutch solenoids 63 and 64 is implemented by a transmission controller 111 shown in FIG. 1. To this end, various signals are input to the transmission controller 111. The transmission controller 111 receives a signal from a vehicle speed sensor 112 that detects vehicle speed VSP. The transmission controller 111 receives an inhibitor signal (selection range signal) from a gear shifter 113 that is manipulated by an operator in order to select one of a P, R, N, or D range referred to above. The transmission controller 111 receives a signal from an oil level sensor 114 that detects an oil level Q in the release-side clutch that is in a released state.

With the engine 1, an engine controller 115 determines output by controlling the fuel injection amount via an injector 116 and controlling a suction air volume via a throttle valve 117. To this end, various signals that are input to the engine controller 115. The engine controller 115 receives a signal from an engine rotation sensor 118 that detects engine speed Ne. The engine controller 115 receives a signal from an acceleration aperture sensor 119 that detects a depression distance of the acceleration pedal (acceleration aperture) APO. The engine controller 115 receives a signal from a throttle aperture sensor 120 that detects a throttle aperture TVO of a throttle valve 117.

An intercommunication circuit 121 is disposed between the engine controller 115 and the transmission controller 111, which mediates exchange of data between the two, including input signals, and is used for respective control thereof.

Figure 3:
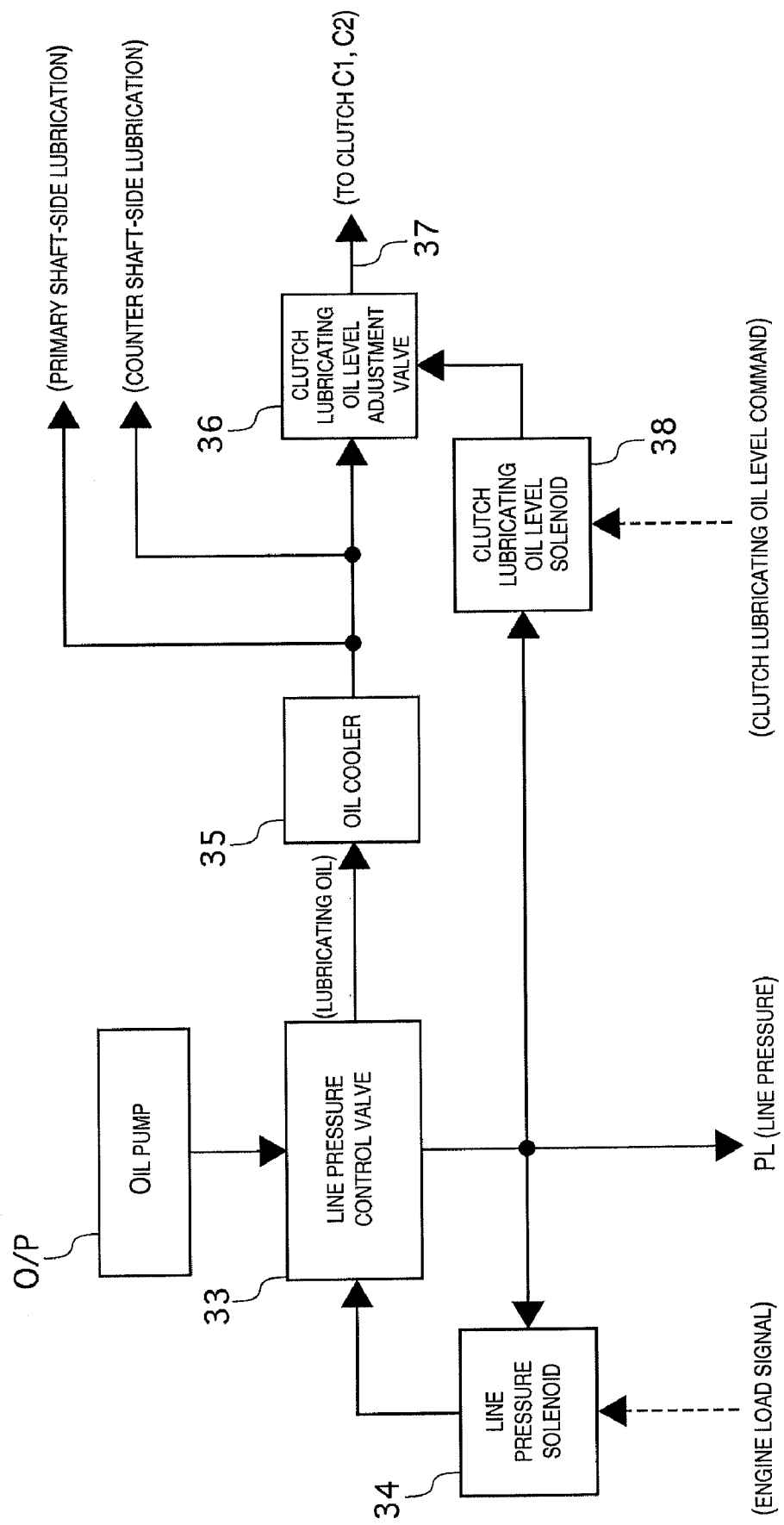
FIG. 3 is an oil pressure circuit diagram that shows a line pressure control circuit and a lubricating circuit in the shifting control system for the twin clutch-type automatic transmission shown in FIG. 2.

FIG. 3 shows a system that generates line pressure PL, which is the base pressure for controlling the twin clutch-type automatic transmission 2 described above. FIG. 3 also shows a lubrication system that governs cooling of the automatic wet rotary clutches C1 and C2. In addition, FIGS. 4 and 5 show the shifting control system that governs automatic shifting of the twin clutch-type automatic transmission 2 described above, with the line pressure PL generated by the system of FIG. 3 used as the base pressure. Specifically, the control system governs control of engagement and release of the clutches C1 and C2 described above. The control system also governs control of the related shifting action of the synchronous meshing mechanisms 21, 22, 29 and 30 from the neutral position, as well as the neutral reversion action carried out as described above (the two being generally referred to as "shifting").

Referring to FIG. 3, the line pressure generation system and the lubricating system for the clutches C1 and C2 that are electronically controlled by the transmission controller 111 of FIG. 1 will be described first. A line pressure control valve 33 adjusts pressure of an operating oil medium from the oil pump O/P (refer to FIG. 2) driven by the engine 1 to the line pressure PL as described below. Based on the line pressure PL, a line pressure solenoid 34 produces a modulator pressure that increases as the engine load (acceleration aperture APO) increases. This modulator pressure is then applied in one direction with respect to the line pressure control valve 33. The line pressure control valve 33 adjusts the line pressure PL so that the force resulting from the modulator pressure counterbalances the force resulting from the spring force in the other direction and the line pressure PL fed back in a direction that is in cooperation therewith. Consequently, the line pressure control valve 33 adjusts the line pressure PL to a value that is in accordance with the modulator pressure referred to above. However, because the modulator pressure increases with an increase in engine load (access aperture APO), the pressure is adjusted so that the line pressure PL increases as the engine load (acceleration aperture APO) increases.

The operating oil that has been drained under the action of the above-described pressure adjustment by the line pressure adjustment valve 33 is made to flow to the oil cooler 35 to be used as lubricating oil. After flowing to the oil cooler, the operating oil is, on the one hand, supplied to both clutches C1 and C2 via a shared clutch lubricating oil channel 37 under flow control of the clutch lubricating oil level adjustment valve 36, thus being utilized for cooling of the clutches C1 and C2. On the other hand, the operating oil is utilized for lubrication of the rotating parts of the counter shaft 10 and for lubrication of the rotating parts of the main shafts 4 to 6.

Flow control by a clutch lubricating oil level adjustment valve 36 is carried out as described below using the solenoid pressure from a clutch lubricating oil level solenoid 38. The clutch lubricating oil level solenoid 38 inputs a command related to the clutch lubricating oil level required for cooling the clutches C1 and C2, which can be determined from the clutch input torque (which can be substituted for the access aperture APO) which is a determining factor in the clutch engagement force and the amount of heat generated by the clutches C1 and C2 determined based on the clutch slip level.

A solenoid pressure is thus produced in accordance with the clutch lubricating oil level command based on the line pressure PL and is supplied to the clutch lubricating oil level adjustment valve 36. The clutch lubricating oil level adjustment valve 36 responds to the solenoid pressure, and taking the lubricating oil level for the clutches C1 and C2 as the oil level corresponding to the clutch lubricating oil level command, increases the lubricating oil level for the clutches C1 and C2 as the clutch heat generation increases. This will reliably cool the clutches C1 and C2. Thus, as is evident, the lubricating oil level for the rotating parts of the counter shaft 10 and the lubricating oil level for the rotating parts of the main shaft 4 to 6 are equal to the oil level determined by subtracting the above-described lubricating oil level for the clutches C1 and C2 from the lubricating oil level from the oil cooler 35.

Next, the shifting control system of FIGS. 4 and 5 will be described in which the transmission controller 111 of FIG. 1 carries out electronic control using the line pressure PL generated as described above in the system of FIG. 3 as a base pressure. The control system that governs shifting of the synchronous meshing mechanisms 21, 22, 29 and 30 in FIG. 2, during this shifting control, has a 1-R shift fork 41, a 3-5 shift fork 42, a 2-4 shift fork 43, a 6-N shift fork 44 and a plurality of shift actuators 45 to 48. The 1-R shift fork 41 is linked to the external circumferential stripe groove of the coupling sleeve 21a. The 3-5 shift fork 42 is linked to the external circumferential stripe groove of the coupling sleeve 22a that constitutes the synchronous meshing mechanism 22. The 2-4 shift fork 43 is linked to the external circumferential stripe groove of the coupling sleeve 30a. The 6-N shift fork 44 is linked to the external circumferential stripe groove of the coupling sleeve 29a. The shift actuators 45 to 48 are operatively coupled to the shift forks 41 to 44 for causing the shift forks 41 to 44 to each undergo the strokes for the above-described shifts. The 1-R shift actuator 45, the 3-5 shift actuator 46, the 2-4 shift actuator 47, and the 6-N shift actuator 48 are each fixed to the transmission case.

The 1-R shift actuator 45 maintains the 1-R shift fork 41 at the current shift position during the period when two end oil channels 51 and 52 are being drained. During draining of the oil channel 52 along with supply of actuator operating oil pressure to the oil channel 51, the 1-R shift fork 41 is moved to the left. Thus, shifting is made to occur from the reverse (R) position to the neutral position shown in FIG. 2, and also from this neutral position to the first speed position. When the oil pressure supply to the oil channel 51 is stopped, the 1-R shift fork 41 is made to stop at its current shift position. During draining of the oil channel 51 along with supply of actuator operating oil pressure to the oil channel 52, the 1-R shift fork 41 is moved to the right. Thus, shifting is made to occur from the first speed position to the middle position shown in FIG. 2, and from this middle position to the reverse (R) position. The 1-R shift fork 41 is made to stop at its current shift position when the oil pressure supply to the oil channel 52 is made to stop.

The 3-5 shift actuator 46 maintains the 3-5 shift fork 42 at its current shift position during the period when the two end oil channels 53 and 54 are being drained. During draining of the oil channel 54 along with supply of actuator operating oil pressure to the oil channel 53, the 3-5 shift fork 42 is moved to the left. Thus, shifting is made to occur from the third speed position to the neutral position in FIG. 2, and from the neutral position to the fifth speed position. When oil pressure supply to the oil channel 53 is stopped, the 3-5 shift fork 42 is made to stop at its current shift position. During draining of the oil channel 53 along with supply of actuator operating oil pressure to the oil channel 54, the 3-5 shift fork 42 is moved to the right. Thus, shifting is made to occur from the fifth speed position to the middle position shown in FIG. 2, and from this middle position to the third speed position. The 3-5 shift fork 42 is made to stop at its current shift position when the oil pressure supply to the oil channel 54 is made to stop.

The 2-4 shift actuator 47 maintains the 2-4 shift fork 43 at the current shift position during the period when the two end oil channels 55 and 56 are being drained. During draining of the oil channel 56 along with supply of actuator operating oil pressure to the oil channel 55, the 2-4 shift fork 43 is moved to the left. Thus, shifting is made to occur from the fourth speed position to the neutral position in FIG. 2, and from the neutral position to the second speed position. When oil pressure supply to the oil channel 55 is stopped, the 2-4 shift fork 43 is made to stop at its current shift position. During draining of the oil channel 55 along with supply of actuator operating oil pressure to the oil channel 56, the 2-4 shift fork 43 is moved to the right. Thus, shifting is made to occur from the second speed position to the middle position shown in FIG. 2, and from this middle position to the fourth speed position. The 2-4 shift fork 43 is made to stop at the present shift position when the oil pressure supply to the oil channel 56 is made to stop.

The 6-N shift actuator 48 maintains the 6-N shift fork 44 at the current shift position during the period when the two end oil channels 57 and 58 are being drained. During draining of the oil channel 58 along with supply of actuator operating oil pressure to the oil channel 57, the 6-N shift fork 44 is moved to the left. Thus, shifting is made to occur from the middle position in FIG. 2 to the sixth speed position. When oil pressure supply to the oil channel 57 is stopped, the 6-N shift fork 44 is made to stop at its current shift position. During draining of the oil channel 57 along with supply of actuator operating oil pressure to the oil channel 58, the 6-N shift fork 44 is moved to the right, and shifting is made to occur from the sixth speed position to the middle position shown in FIG. 2. The 6-N shift fork 44 is made to stop at its current shift position when the oil pressure supply to the oil channel 58 is made to stop.

Taking the 1-R shift actuator 45 for the odd-numbered gear shift stage group and the 3-5 shift actuator 46 as a single group, an odd-numbered gear shift stage pressure valve 61 is provided that generates an odd-numbered gear shift stage pressure Po which is the action base pressure for the shift actuators 45 and 46. Taking the 2-4 shift actuator 47 for the even-numbered gear shift stage and the 6-N shift actuator 48 as a single group, an even-numbered gear shift stage pressure valve 62 is provided that generates an even-numbered gear shift stage pressure Pe which is the action base pressure of the shift actuators 47 and 48.

The odd-numbered gear shift stage pressure valve 61 and the even-numbered gear shift stage pressure valve 62 respectively produce the odd-numbered gear shift stage pressure Po and even-numbered gear shift stage pressure Pe based on the line pressure PL output as described above by the system of FIG. 3.

The odd-numbered gear shift stage pressure Po and even-numbered gear shift stage pressure Pe are respectively used, on the one hand, as the engagement control base pressure for the odd-numbered gear shift stage clutch C1 and the even-numbered gear shift stage clutch C2, and, on the other hand, as the base pressure for shift control by the shift actuators 45, 46 and 47, 48.

An odd-numbered gear shift stage clutch solenoid 63 is provided for controlling engagement of the odd-numbered gear shift stage clutch C1. This odd-numbered gear shift stage clutch solenoid 63 produces an engagement pressure Pc1 for the odd-numbered gear shift stage clutch C1 from the odd-numbered gear shift stage pressure Po. This odd-numbered gear shift stage clutch solenoid 63 serves to control engagement and release of the odd-numbered gear shift stage clutch C1 as described above.

In addition, an even-numbered gear shift stage clutch solenoid 64 is provided for controlling engagement of the even-numbered gear shift stage clutch C2. This even-numbered gear shift stage clutch solenoid 64 produces an engagement pressure Pc2 for the even-numbered gear shift stage clutch C2 from the even-numbered gear shift stage pressure Pe. This even-numbered gear shift stage clutch solenoid 64 serves to control engagement and release of the even-numbered gear shift stage clutch C2 as described above.

The shift control system is described below. A sequence solenoid valve 70, which is a shared power ON/OFF-type shift actuator selection valve, is introduced between the shift actuators 45, 46, 47 and 48 and the odd-numbered gear shift stage pressure valve 61 and even-numbered gear shift stage pressure valve 62. Thus, an odd-numbered gear shift stage shift actuator module 80 is provided between the sequence solenoid valve 70 and the odd-numbered gear shift stage valve 61 for outputting the operating oil pressure of the 1-R shift actuator 45 or the 3-5 shift actuator 46 by using the odd-numbered gear shift stage pressure Po as the base pressure, and that determines whether to supply this actuator operating oil pressure either to the shift actuator 45 or the shift actuator 46.

In addition, provided between the sequence solenoid valve 70 and the even-numbered gear shift stage valve 62 is an even-numbered gear shift stage shift actuator module 90 for outputting the operating oil pressure of the 2-4 shift actuator 47 or the 6-N shift actuator 48 by using the even-numbered gear shift stage pressure Pe as the base pressure, and that determines whether to supply this actuator operating oil pressure either to the shift actuator 47 or to the shift actuator 48.

The sequence solenoid valve 70 has a valve body 71 and a solenoid 72. The sequence solenoid valve 70 is configured so that the solenoid oil pressure from the solenoid oil channel 74 and the spring pressure of the spring 73 on both ends of the valve body 71 act in opposition. When the solenoid 72 is ON and acts against the spring force of the spring 75, the line pressure PL is output as the solenoid oil pressure to the solenoid oil channel 74, and the valve body 71 opposes the spring force of the spring 73, thereby producing the oil channel connection state indicated by the dotted line in FIG. 4 (solid line in FIG. 5). When the solenoid 72 is OFF and produces a draining state in the solenoid oil channel 74 due to the spring force of the spring 75, the valve body 71 assumes the oil channel connection state indicated by the solid line in FIG. 4 (dotted line in FIG. 5) due to the spring force of the spring 73. When the solenoid 72 is OFF and the valve body 71 assumes the oil channel connection state indicated by the solid line in FIG. 4 (dotted line in FIG. 5), as shown in FIG. 4, the valve body 71 makes the two end oil channels 53 and 54 of the 3-5 shift actuator 46, and the two end oil channels 57 and 58 of the 6-N shift actuator 48, communicate with the drain port, and the shift actuators 46, 48 are placed in a shift control disabled state. Also, the two end oil channels 51 and 52 of the 1-R shift actuator 45 and the two end oil channels 55 and 56 of the 2-4 shift actuator 47 are connected to the corresponding odd-numbered gear shift stage shift actuator module 80 and the even-numbered gear shift stage shift actuator module 90. The 1-R shift actuator 45 and the 2-4 shift actuator 47 are placed in a shift control enabled state in which the actuators can be controlled by the individual shift actuator modules 80 and 90.

When the solenoid 72 is ON and the valve body 71 is placed in the oil channel connection state indicated by the dotted line in FIG. 4 (solid line in FIG. 5), as shown in FIG. 5, the valve body 71 makes the two end oil channels 51 and 52 of the 1-R shift actuator 45 and the two end oil channels 55 and 56 of the 2-4 shift actuator 47 communicate with the drain port. The shift actuators 45 and 47 are then placed in a shift control disabled state. Also, the two end oil channels 53 and 54 of the 3-5 shift actuator 46 and the two end oil channels 57 and 58 of the 6-N shift actuator 48 are respectively connected to the corresponding odd-numbered gear shift stage shift actuator module 80 and the even-numbered gear shift stage shift actuator module 90. The 3-5 shift actuator 46 and the 6-N shift actuator 48 are thus placed in a shift control enabled state wherein they can be controlled by the individual shift actuator modules 80 and 90.

The odd-numbered gear shift stage shift actuator module 80 has odd-numbered gear shift stage shift pressure solenoids 81 and 82 for outputting two types of shift pressures Po1 and Po2 by using the odd-numbered gear shift stage pressure Po as the base pressure; and shift solenoids 83 and 84 for determining whether to drain the corresponding end oil channels or to supply these odd-numbered gear shift stage shift pressures Po1 and Po2 to the corresponding end oil channels of the 3-5 shift actuator 46 or 1-R shift actuator 45 that have been selected and enabled for shift control by the sequence solenoid valve 70 (valve body 71) as described above.

Thus, under normal circumstances (when OFF), the shift solenoids 83 and 84 drain the corresponding end oil channel of the 1-R shift actuator 45 or the 3-5 shift actuator 46 that have been enabled for shift control by the above-described selection. Alternatively, when in an actuated and ON state, the shift solenoids 83 and 84 supply the odd-numbered gear shift stage shift pressures Po1 and Po2 to the corresponding end oil channel of the 1-R shift actuator 45 or the 3-5 shift actuator 46 that have been enabled for shift control by the above-described selection, as shown in FIGS. 4 and 5.

The even-numbered gear shift stage shift actuator module 90 has even-numbered gear shift stage shift pressure solenoids 91 and 92 for outputting two types of shift pressures Pe1 and Pe2 by using the even-numbered gear shift stage pressure Pe as the base pressure. The shift solenoids 93 and 94 determine whether to drain the corresponding end oil channels or to supply these even-numbered gear shift stage shift pressures Pe1 and Pe2 to the corresponding end oil channel of the 2-4 shift actuator 47 or the 6-N shift actuator 48 that have been selected and enabled for shift control by the sequence solenoid valve 70 (valve body 71) as described above.

Thus, under normal circumstances (when OFF), the shift solenoids 93 and 94 drain the corresponding end oil channel of the 2-4 shift actuator 47 or the 6-N shift actuator 48 that have been enabled for shift control by the above-described selection. Alternatively, when in an actuated and ON state, the shift solenoids 93 and 94 supply the even-numbered gear shift stage shift pressures Pe1 and Pe2 to the corresponding end oil channel of the 2-4 shift actuator 47 or 6-N shift actuator 48 that have been enabled for shift control by the above-described selection, as shown in FIGS. 4 and 5.

The shift control system for the synchronous meshing mechanisms 21, 22, 29 and 30 (refer to FIG. 2) described above in FIGS. 4 and 5 is described below.

First Speed—Pre-shift

When the first speed is desired in a forward travel range such as the D range, the sequence solenoid valve 70 (valve body 71) is OFF, and thus the oil channel connection state indicated in FIG. 4 is produced. Selection is made so that the 1-R shift actuator 45 and the 2-4 shift actuator 47 are enabled for shift control, whereas the 3-5 shift actuator 46 and the 6-N shift actuator 48 are disabled for shift control. In this state, when the shift solenoid 83 is turned ON, the odd-numbered gear shift stage shift pressure Po1 is supplied to the corresponding end oil channel 51 of the 1-R sift actuator 45. When the shift solenoid 84 is OFF, the corresponding end oil channel 52 of the 1-R shift actuator 45 is drained. The 1-R shift actuator 45 can thereby cause the 1-R shift fork 41 to shift to the first speed position, and the desired odd-numbered gear shift stage group to be pre-shifted to the first speed as described above with the first speed.

Shifting of the 1-R shift fork 41 to the first speed position (pre-shifting of the odd-numbered gear shift stage group to the first speed) is appropriately carried out and completed by adjusting the odd-numbered gear shift stage shift pressure Po1 with the aid of the solenoid 81. The shift solenoid 83 is turned OFF when the shifting is completed.

In addition, when the aforementioned first speed is established in response to an operation for moving the selection from the N range to the D range, pre-shifting of the even-numbered gear shift stage group to the second speed as described above is also completed simultaneous to pre-shifting of the aforementioned odd-numbered gear shift stage group to the first speed. The operation is performed as described below.

Specifically, the sequence solenoid valve 70 (valve body 71) is switched off and is thereby brought into the oil channel connection state shown in FIG. 4, the shift solenoid 93 is turned ON, and the even-numbered gear shift stage shift pressure Pe1 is supplied to the corresponding end oil channel 55 of the 2-4 shift actuator 47. Also, the shift solenoid 94 is turned OFF, and the opposite-end oil channel 56 of the 2-4 shift actuator 47 is thereby drained.

The 2-4 shift actuator 47 can thereby cause the 2-4 shift fork 43 to pre-shift to the second speed position, and the desired even-numbered gear shift stage group to be pre-shifted to the second speed as described above with the first speed. Shifting of the 2-4 shift fork 43 to the second speed position (pre-shifting of the even-numbered gear shift stage group to the second speed) is appropriately carried out and completed by adjusting the even-numbered gear shift stage shift pressure Pe1 with the aid of the solenoid 91. The shift solenoid 93 is turned OFF when the shifting is completed.

Second Speed—Pre-Shifting

When the second speed is established upon completion of 12 shifting, pre-shifting to the third speed of the odd-numbered gear shift stage group is carried out as described above. Specifically, the coupling sleeve 22a of the synchronous meshing mechanism 22 is caused to move to the right in FIG. 2 to drivably link the gear 19 to the first input shaft 4, and the odd-numbered gear shift stage group is caused to undergo 1→3 pre-shifting. The operation is executed in the manner described below.

Specifically, the sequence solenoid valve 70 (valve body 71) is turned ON and switched to the oil channel connection state indicated in FIG. 5, and selection is made so that the 3-5 shift actuator 46 and the 6-N shift actuator 48 are enabled for shift control, whereas the 1-R shift actuator 45 and the 2-4 shift actuator 47 are disabled for shift control.

In this state, the shift solenoid 83 is turned ON, and the odd-numbered gear shift stage shift pressure Po1 is supplied to the corresponding end oil channel 54 of the 3-5 shift actuator 46. Also, the shift solenoid 84 is turned OFF, and the opposite-end oil channel 53 of the 3-5 shift actuator 46 is thereby drained.

The 3-5 shift actuator 46 can thereby cause the 3-5 shift fork 42 to shift to the third speed position, and pre-shifting of the desired odd-numbered gear shift stage group to the third speed to be carried out as described above with the second speed. Shifting of the 3-5 shift fork 42 to the third speed position (pre-shifting of the odd-numbered gear shift stage group to the third speed) is carried out and completed appropriately by adjusting the odd-numbered gear shift stage shift pressure Po1 by the solenoid 81. The shift solenoid 83 is turned OFF when the shifting is completed.

Third Speed—Pre-Shifting

When the third speed is established upon completion of 2→3 shifting, the even-numbered gear shift stage group to the fourth speed is pre-shifted as described above. Specifically, the coupling sleeve 30a of the synchronous meshing mechanism 30 is returned to the middle position in FIG. 2, the gear 26 is separated from the counter shaft 10, and the coupling sleeve 30a of the synchronous meshing mechanism 30 is moved to the right to drivably link the gear 28 to the counter shaft 10, thereby carrying out 2→4 pre-shifting of the even-numbered gear shift stage group. The operation is executed in the manner described below.

Specifically, the sequence solenoid valve 70 (valve body 71) is turned OFF and switched to the oil channel connection state shown in FIG. 4, and selection is made so that the 1-R shift actuator 45 and the 2-4 shift actuator 47 are enabled for shift control, whereas the 3-5 shift actuator 46 and the 6-N shift actuator 48 are disabled for shift control.

In this state, the shift solenoid 94 is turned ON, and the even-numbered gear shift stage shift pressure Pe2 is supplied to the corresponding end oil channel 56 of the 2-4 shift actuator 47. Also, the shift solenoid 93 is turned OFF, and the opposite-end oil channel 55 of the 2-4 shift actuator 47 is thereby drained. The 2-4 shift actuator 47 can thereby cause the 2-4 shift fork 43 to shift to the fourth speed position, and pre-shifting of the desired even-numbered gear shift stage group from the second speed to the fourth speed to be carried out as described above with the third speed.

Shifting of the 2-4 shift fork 43 to the fourth speed position (pre-shifting of the even-numbered gear shift stage group from the second speed to the fourth speed) is appropriately carried out and completed by adjusting the even-numbered gear shift stage shift pressure Pe2 with the aid of the solenoid 92. The shift solenoid 94 is turned off when the shifting is completed.

Fourth Speed—Pre-Shifting

When the fourth speed is established upon completion of 3→4 shifting, the odd-numbered gear shift stage group is pre-shifted to the fifth speed as described above. Specifically, the coupling sleeve 22a of the synchronous meshing mechanism 22 is returned to the middle position in FIG. 2, the gear 19 is separated from the first input shaft 4, and the coupling sleeve 22a of the synchronous meshing mechanism 22 is moved to the left to drivably link the gear 31 to the first input shaft 4, thereby carrying out 3→5 pre-shifting of the odd-numbered gear shift stage group. The operation is executed in the manner described below.

Specifically, the sequence solenoid valve 70 (valve body 71) is turned ON to switch to the oil channel connection state shown in FIG. 5, and selection is made so that the 3-5 shift actuator 46 and the 6-N shift actuator 48 are enabled for shift control, whereas the 1-R shift actuator 45 and 2-4 shift actuator 47 are disabled for shift control.

In this state, the shift solenoid 84 is turned ON, and the odd-numbered gear shift stage shift pressure Po2 is supplied to the corresponding end oil channel 53 of the 3-5 shift actuator 46. Also, the shift solenoid 83 is turned OFF, and the opposite-end oil channel 54 of the 3-5 shift actuator 46 is thereby drained.

The 3-5 shift actuator 46 can thereby cause the 3-5 shift fork 42 to shift to the fifth speed position, and the desired odd-numbered gear shift stage group to be pre-shifted from the third speed to the fifth speed as described above with the fourth speed. Shifting of the 3-5 shift fork 42 to the fifth speed position (pre-shifting of the odd-numbered gear shift stage group fro the third speed to the fifth speed) is appropriately carried out and completed by adjusting the odd-numbered gear shift stage shift pressure Po2 with the aid of the solenoid 82. The shift solenoid 84 is turned off when the shifting is completed.

Fifth Speed—Pre-Shifting

When the fifth speed is established upon completion of 4→5 shifting, the even-numbered gear shift stage group is pre-shifted to the sixth speed as described above. Specifically, the coupling sleeve 30a of the synchronous meshing mechanism 30 is returned to the middle position in FIG. 2, the gear 28 is separated from the counter shaft 10, and the coupling sleeve 29a of the synchronous meshing mechanism 29 is moved to the left to drivably link the gear 24 to the counter shaft 10, thereby carrying out 4→6 pre-shifting of the even-numbered gear shift stage group. The operation is executed in the manner described below.

Specifically, the sequence solenoid valve 70 (valve body 71) is turned OFF to switch to the oil channel connection state shown in FIG. 4, and selection is made so that the 1-R shift actuator 45 and the 2-4 shift actuator 47 are enabled for shift control, whereas the 3-5 shift actuator 46 and the 6-N shift actuator 48 are disabled for shift control.

In this state, the shift solenoid 93 is turned ON, and the even-numbered gear shift stage shift pressure Pe1 is supplied to the corresponding end oil channel 55 of the 2-4 shift actuator 47. Also, the shift solenoid 94 is turned OFF, and the opposite-end oil channel 56 of the 2-4 shift actuator 47 is thereby drained.

The 2-4 shift actuator 47 thereby returns the 2-4 shift fork 43 from the fourth speed position to the center position. The return to the center position is appropriately carried out and completed by adjusting the even-numbered gear shift stage shift pressure Pe1 with the aid of the solenoid 91. The shift solenoid 93 is turned off when the shifting is completed.

Next, the sequence solenoid valve 70 (valve body 71) is turned ON to switch to the oil channel connection state shown in FIG. 5, and selection is made so that the 3-5 shift actuator 46 and the 6-N shift actuator 48 are enabled for shift control, whereas the 1-R shift actuator 45 and 2-4 shift actuator 47 are disabled for shift control.

In this state, the shift solenoid 93 is turned ON, and the even-numbered gear shift stage shift pressure Pe1 is supplied to the corresponding end oil channel 57 of the 6-N shift actuator 48. Also, the shift solenoid 94 is turned OFF, and the opposite-end oil channel 58 of the 6-N shift actuator 48 is thereby drained.

The 6-N shift actuator 48 can thereby cause the 6-N shift fork 44 to shift to the sixth speed position from the middle position, where this shift is appropriately carried out and completed by adjusting the even-numbered gear shift stage shift pressure Pe1 with the aid of the solenoid 91. The shift solenoid 93 is turned OFF when the shifting is completed.

Pre-shifting of the desired even-numbered gear shift stage group from the fourth speed to the sixth speed can thus be carried out as described above for the fifth speed.

Sixth Speed—Pre-Shifting

The sixth speed is established upon completion of 5→6 shifting. As described above, pre-shifting of the odd-numbered gear shift stage group to the fifth speed is required. During implementation of the sixth speed, the coupling sleeve 22a of the synchronous meshing mechanism 22 is shifted to the fifth sped position in the same manner as during implementation of the fifth speed in FIG. 2, and this pre-shifting control is therefore not necessary in actual practice.

Pre-Shifting During Downshifting

In cases where downshifting from sixth speed to first speed is sequentially carried out, pre-shifting control can be carried out in reverse relative to the upshifting described above, whereby pre-shifting can be carried out in a prescribed reverse direction.

Now, allowing or inhibiting pre-shifting in accordance with the release-side clutch oil level will be discussed. Situations often occur in which heat is generated in the engage-side clutch C1 or C2 by slip engagement. In such situations, as described above in reference to FIG. 3, the clutch lubricating oil level command that is sent to the clutch lubricating oil level solenoid 38 is set to the clutch oil supply level command value so that a large quantity of lubricating oil is supplied from the lubricating oil channel 37 to both the clutch C1 and C2. For this reason, when the clutch C1 or C2 is generating heat due to slip engagement on the engaging side that is not involved in pre-shifting, a large quantity of lubricating oil is supplied to the release-side clutch, which is in a released state on the pre-shift side. When a large quantity of lubricating oil is supplied in this manner to the released clutch on the pre-shift side (release-side clutch), a large amount of lubricating oil is introduced between the clutch disks that have separated from each other in the clutch on the pre-shift side (release-side clutch), and drag torque is directed to the related synchronous meshing mechanism by the released pre-shift-side clutch (release-side clutch) via the introduced lubricating oil.

The clutch drag torque makes it difficult to synchronize the forward and reverse rotation of the synchronous meshing mechanism participating in pre-shifting. As a result, pre-shifting becomes difficult or impossible to perform. There thus arises the problem that shifting itself that occurs via this pre-shifting becomes difficult or impossible, as well as the problem that the synchronous meshing mechanism is damaged by unnatural and forced synchronous action, reducing durability. For this reason, the shift control system eliminates forced pre-shifting under conditions in which a significant drag torque is generated via the large quantity of internal oil contained in the release-side clutch that is in a released state, making pre-shifting of the gear shift stage group on the release-side clutch difficult or impossible. Thus, with the shifting control system of the illustrated embodiment, it is possible to resolve problems with damage to the corresponding synchronous meshing mechanism and loss of durability thereof as a result of forcing this pre-shift, as well as the other problems described above that are entailed by the prior art.

For example, for the reasons described above, the oil level Q in the release-side clutch C1 or C2 (detected by the oil level sensor 114 in FIG. 1) is high, and drag torque is generated whereby pre-shifting becomes difficult or impossible due to difficulties with synchronizing the forward and reverse rotation of the synchronous meshing mechanism involved in pre-shifting via the large quantity of lubricating oil introduced between the clutch disks that are separated from each other in the release-side clutch C1 or C2. In such a case, in addition to problems related to difficult or impossible pre-shifting, problems also arise with damage and decreased durability of the synchronous meshing mechanism. In order to resolve these problems, in this example, the transmission controller 111 of FIG. 1 controls pre-shifting so as to allow or inhibit, based on the control program shown in FIG. 6, the pre-shifting in accordance with the internal oil level in the release-side clutch, as described below.

First, in step S1, which corresponds to the clutch release detection section, a check is made as to whether the release-side clutch C1 or C2 is in a released state that has no engagement capacity. For example, a check is made as to whether a released state has been produced in accordance with the state of the command from the transmission controller 111 to the C1 and C2 solenoids 63 and 64 for activating the release-side clutch C1 or C2.

When the release-side clutch C1 or C2 has not yet reached a released state, the clutch still has engagement capacity, and pre-shifting of the related gear shift stage group cannot be carried out. Consequently, control progresses to step S6, and actual pre-shifting is inhibited by inhibiting the setting of a gear position for pre-shifting. Thus, step S6 corresponds to a part of pre-shift inhibiting section in the illustrated embodiment.

When the release-side clutch C1 or C2 is in a released state in step S1, and a determination is made that there is no engagement capacity, pre-shifting of the related gear shift stage group can be carried out, and control therefore progresses to step S2 to step S5.

In step S2, the oil level Q inside the release-side clutch C1 or C2 that has been detected by the oil level sensor 114 in FIG. 1 is read.

In step S3, the oil level Q in the release-side clutch is checked to determine whether the level is at or above the preset oil level Qs.

Consequently, step S3 corresponds to the release-side clutch oil level detection section in the illustrated embodiment. The preset oil level Qs is set at a value corresponding to the lower limit of an oil level at which a pre-shifting-impeding drag torque is produced in the gear shift stage group for the release-side clutch C1 or C2.

When, in step S3, the oil level Q in the release-side clutch is determined to be less than the preset oil level Qs, drag torque that obstructs pre-shifting via the oil inside the release-side clutch C1 or C2 is not generated. Control therefore progresses to step S5, the setting of a gear location for pre-shifting is allowed, and pre-shifting is carried out as usual without restrictions.

However, when it has been determined that the oil level Q in the release-side clutch is at or above the preset oil level Qs in step S3, the release-side clutch C1 or C2 generates a drag torque that obstructs pre-shifting via the oil introduced inside. Control therefore progresses to step S4, and pre-shifting is substantially prevented because the setting of a gear position for pre-shifting is inhibited. Consequently, step S4 corresponds to a pre-shift inhibiting section in the illustrated embodiment.

When $Q \geqq Qs$, the release-side clutch C1 or C2 generates high drag torque via the internal oil, making pre-shifting difficult or impossible, damaging the related synchronous meshing mechanism, and reducing the durability thereof.

In the example, pre-shifting was inhibited in step S4 under these types of conditions ($Q \geqq Qs$). Situations are therefore prevented in which pre-shifting is forced despite being difficult or impossible to perform, making it possible to resolve problems in which the related synchronous meshing mechanism is damaged and rendered less durable by such forced pre-shifting.

In addition, in the above-described example, the oil level Q inside the release-side clutch C1 or C2 is directly detected by the oil level sensor 114 of FIG. 1 at the time that the determination of Q≧Qs is made in step S3. Because this process involves determining whether the detected value is equal to or greater than the preset oil level Qs, the oil level Q in the release-side clutch C1 or C2 is accurately detected, and pre-shifting can be accurately inhibited without any determination errors.

However, the decision criteria of Q≧Qs in step S3 is not restricted to the use of the oil level Q directly detected in the release-side clutch C1 or C2 by the oil level sensor 114. For example, because the lubricating oil supply level to both the clutches C1 and C2 is expressed by the clutch lubrication oil level command (clutch oil supply level command value) from the transmission controller 111 to the clutch lubricating oil level solenoid 38 shown in FIG. 3, the oil level Q in the release-side clutch C1 or C2 can be estimated from the clutch oil supply level command value. Thus, it is possible to carry out a determination of Q≧Qs based on whether or not this detected value is equal to or greater than the preset oil level Qs. In this case, the oil level sensor 114 in FIG. 1 is not necessary, which provides advantages from a cost standpoint.

In contrast to FIG. 3, in controlling the lubricating oil supply levels of the clutches C1 and C2 separately, the oil level Q of the release-side clutch C1 or C2 is estimated from either one of the clutch oil supply level command values for the clutches C1 and C2, preferably from the clutch oil supply level command value for the release-side clutch, or from both of the clutch oil supply level command values. It is then determined whether Q≧Qs based on whether the detected value is at or above the preset oil level Qs.

Figure 6:
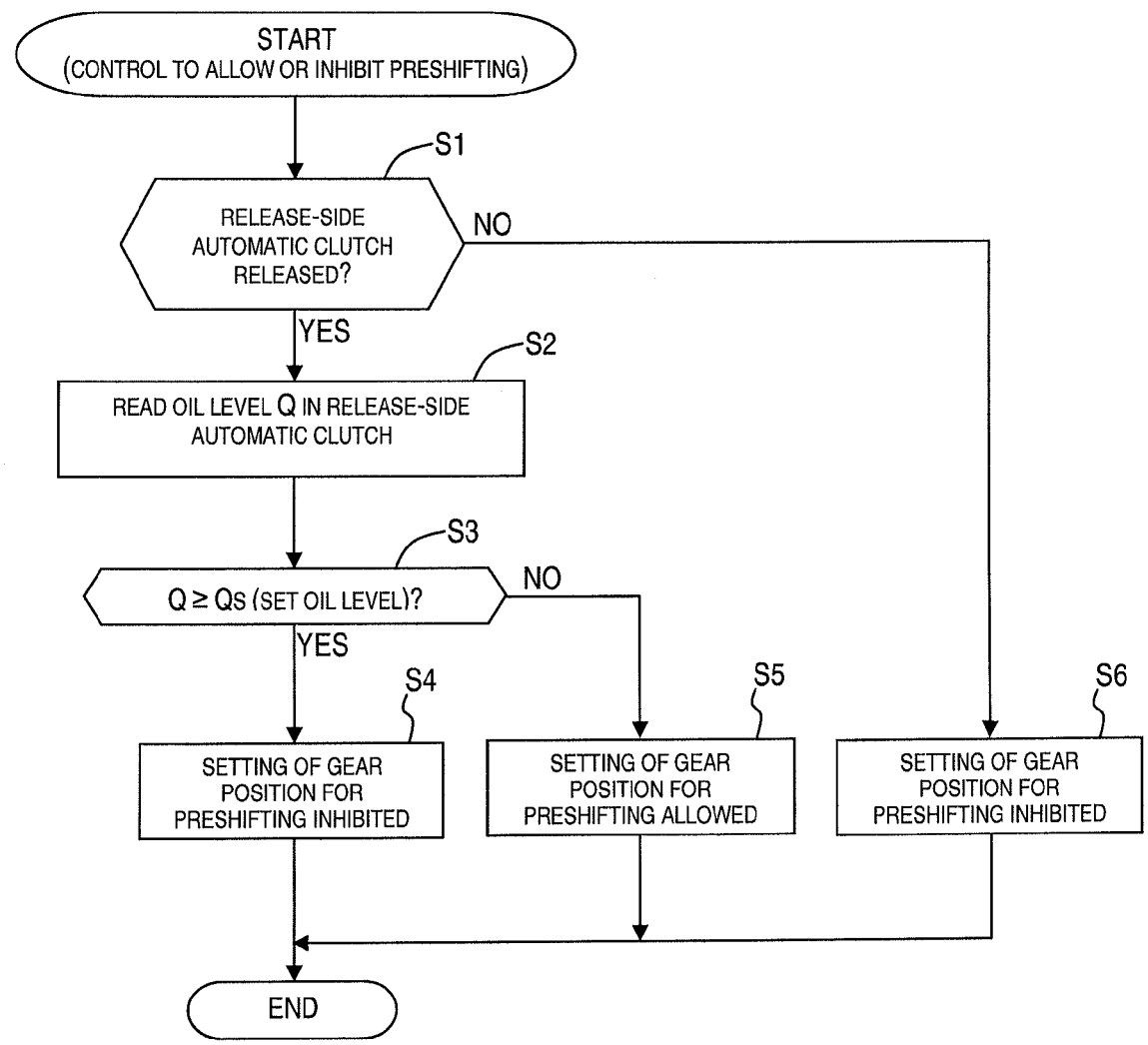
FIG. 6 is a flowchart for the pre-shift control program executed by the transmission controller of FIG. 1 in the illustrated embodiment of FIGS. 1 to 5.
Figure 7:
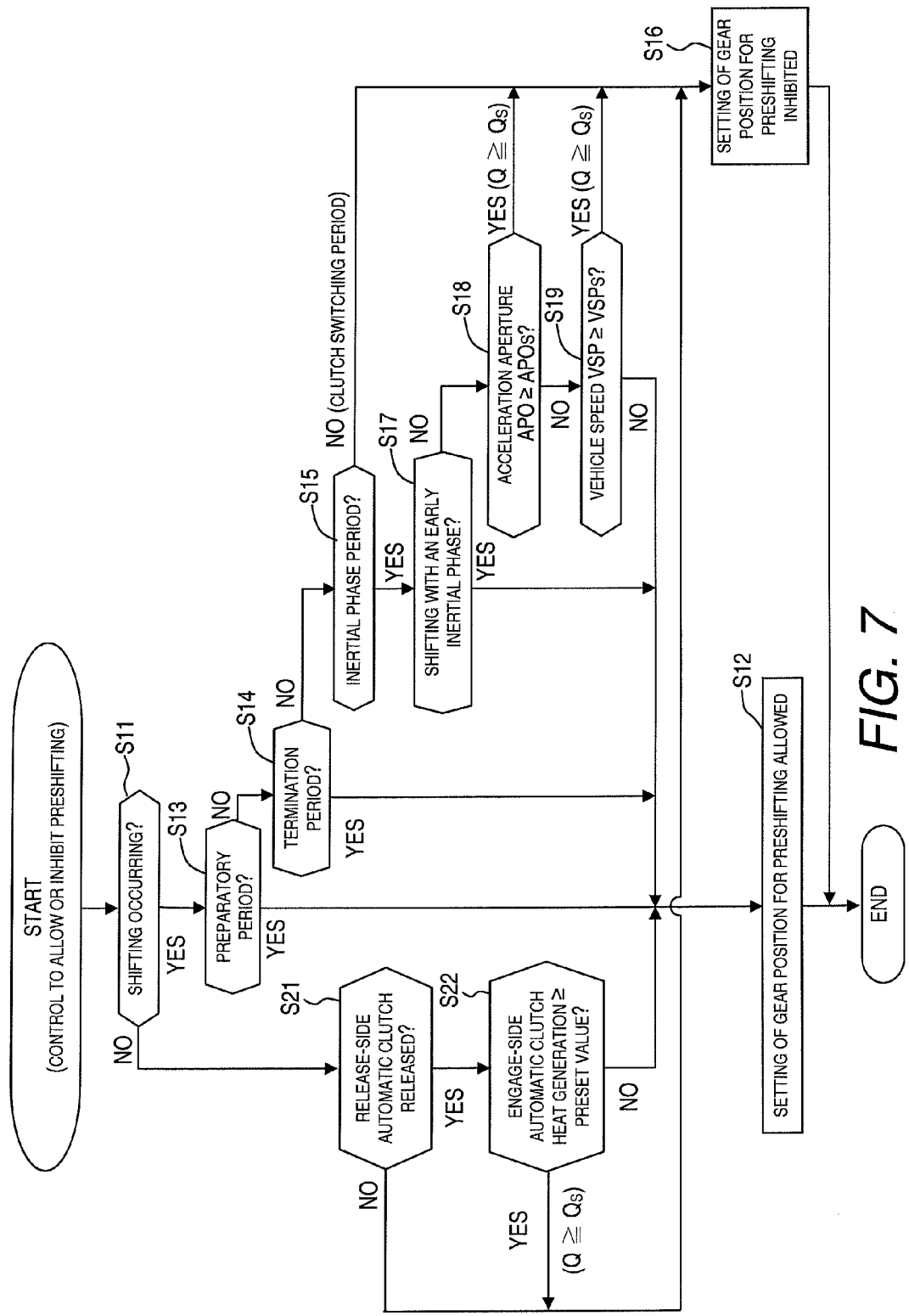
FIG. 7 is a flowchart for a pre-shift control program, similar to FIG. 6, showing another example of a pre-shift control program executed by the transmission controller of FIG. 1 in the illustrated embodiment of FIGS. 1 to 5.

FIG. 7 shows a pre-shift control program according to another example of the illustrated embodiment as an alternative to the one shown in FIG. 6.

In this example, an increase in the amount of heat generated by the engage-side clutch C2 or C1, as described above in reference to FIG. 3, causes an increase in the clutch lubricating oil level command for the clutch lubricating oil level solenoid 38 shown in FIG. 3, which represents the oil supply amount of the clutches C1 and C2, and the oil level Q in the release-side clutch C1 or C2 increases. In view of the above-described problems caused by drag torque, the transmission control 111 of FIG. 1 executes the control program shown in FIG. 7, which is intended to overcome the problems, and pre-shifting is controlled so as to be allowed or inhibited in accordance with the generation of heat, as described below.

First, in step S11, a check is made as to whether the twin clutch-type automatic transmission 2 is undergoing shifting.

If shifting is occurring, then, as is clear from the above description, the shifting is being executed by the switching of the clutches C1 and C2. Therefore, the heat (and thus the clutch lubricating oil level) generated by the slip engagement of the clutch C1 or C2 on the engage side is potentially high enough to cause the above-described problems.

In addition, there are cases where the heat generated by slip engagement of the engage-side clutch C1 or C2 is high even if shifting is not occurring, as when the vehicle starts moving, and the clutch lubricating oil level in clutches C1 and C2 may be high enough to cause the above-described problems due to the heat generated during slip engagement of the engage-side clutch C1 or C2 even when the release-side clutch C2 or C1 is in a released state and does not generate any heat.

In light of the situation with the latter case of no shifting, the following checks are performed at the point when it is determined that there is no shifting in step S11. Namely, it is checked in step S21 whether the release-side clutch is in a completely released state. Then, it is checked in step 22 whether the amount of generated heat in the engage-side clutch (determined from the clutch input torque, slip rotation, or the like) is at or above a preset value, as when the vehicle starts moving, and whether the oil level Q in the release-side clutch will cause the above-described problem (whether Q≧Qs).

Consequently, step S21 corresponds to the clutch release detection section in the illustrated embodiment, and step S22 corresponds to the clutch oil level detection section in the illustrated embodiment.

When it is determined in step S21 that the release-side clutch is in a released state and it is determined in step S22 that the amount of heat generated on the engage-side clutch is less than the preset value, then the clutch lubricating oil level Q is such that Q<Qs in the release-side clutch C1 or C2. It is then determined that this condition will not cause a drag torque to be generated on the release-side clutch that will obstruct pre-shifting, and that the above-described problems will not arise. Control is thereby moved to step S12, and the setting of a gear position for pre-shifting is allowed.

However, when it is determined in step S21 that the release-side clutch is not in a released state (slip engagement), then the engage-side clutch is in an engaged state as well, and it is not possible to pre-shift the gear shift stage group related to the release-side clutch. Control therefore progresses to step S16, and the setting of a gear position for pre-shifting is inhibited.

In addition, when it is determined in step S21 that the release-side clutch is in a released state, and it is determined in step S22 that the amount of heat generated on the engage-side clutch is at or above a preset value, then the clutch lubricating oil level Q is such that Q≧Qs in the clutch C1 or C2. It is then determined that a condition is established in which a pre-shifting-impeding torque will be produced in the release-side clutch, and that the above-described problems will arise. Control is thereby moved to step S16, and the setting of a gear position for pre-shifting is inhibited. Thus, step S16 corresponds to the pre-shift inhibiting section in the illustrated embodiment.

A configuration is thus adopted in which pre-shifting is inhibited when the heat generation state of the engage-side clutch C1 or C2 corresponds to a heat generation state in which the clutch lubricating oil level (Q≧Qs) is such that a pre-shifting-impeding drag torque is generated in the release-side clutch because there is no shifting, the vehicle starts moving, or the like. Thus, pre-shifting is not forced when pre-shifting is difficult or impossible to perform due to a large drag torque acting on the release side clutch, making it possible to resolve problems in which the corresponding synchronous meshing mechanism is damaged and rendered less durable by such forced pre-shifting.

When it is determined in step S11 that shifting is occurring, then control is moved to step S13 and beyond, and a check is made as to whether or not the amount of heat generated (release-side clutch lubricating oil level Q) in the engage-side clutch C1 (C2) is enough to give rise to a pre-shifting-impeding drag torque in the release-side clutch in view of the released state of the release-side clutch C2 (C1). Based on the results, the setting of a gear position for pre-shifting is inhibited when the amount of heat generated (release-side clutch lubricating oil level Q) in the engage-side clutch C1 (C2) will cause a pre-shifting-impeding drag torque to be generated in the clutch in view of the released state of the release-side clutch C2 (C1).

The shifting process is divided into four periods when it is checked whether the amount of heat generated (release-side clutch lubricating oil level Q) in the engage-side clutch C1 (C2) is enough to cause a pre-shifting-impeding drag torque to be generated in the release-side clutch in view of the released state of the release-side clutch C2 (C1).

The first period is a preparatory period which corresponds to one in which, prior to initiation of switching of the clutches C1 and C2, the released clutch (engage-side clutch) is in a condition of still having an engagement capacity of zero despite being moved through a stroke by the supply of operating oil (the stroke is referred to as "a backlash-reducing loss stroke"), and in which slip will still not occur even if the engagement capacity of the engaged clutch (release-side clutch) is gradually decreased due to the decrease in engagement oil pressure.

The second period is a clutch switching period corresponding to one in which, after the released clutch (engage-side clutch) has undergone the above-described loss stroke, the engagement capacity is gradually increased from zero by the increase in engagement oil pressure, and in which the engaged clutch (release-side clutch) slips due to the additional decrease in engagement oil pressure.

The third period is an inertial period corresponding to one in which the effective gear ratio; that is, the ratio of the input rotational speed of the transmission with respect to the output rotational speed of the transmission, is changed from the pre-shift gear ratio to the post-shift gear ratio by the progress of shifting (the degree of progress of the inertial phase is determined by the change in the input rotational speed of the transmission based on the fact that the shifting lasts only a short time and the output rotational speed of the transmission can be regarded as invariant).

The fourth period is a termination period corresponding to one in which shifting has been completed, in which the engage-side clutch whose engagement capacity is gradually increasing is completely engaged, and in which the release-side clutch whose engagement capacity is gradually decreasing is completely released (brought to a released state).

Basically, a check is carried out based on these four periods as to whether the amount of heat generated (release-side clutch lubricating oil level Q) in the engage-side clutch C1 or C2 is large enough to produce a pre-shifting-impeding drag torque in the release-side clutch in view of release condition of the release-side clutch.

It is determined in step S13 whether the process is in the preparatory period, and it is determined in step S14 whether the process is in the termination period. Moreover, it is determined in step S15 whether the process is in the inertial phase period (clutch switching period).

When it is determined in step S13 that the process is in the shift preparatory period, the clutch C1 or C2 is still in a completely engaged state or completely released state in which the gear shift stage prior to shifting is maintained, and the amount of heat generated (release-side clutch lubricating oil level Q) in the clutch C1 and C2 is not enough to produce a pre-shifting-impeding clutch drag torque (Q≦Qs). Control therefore progresses to step S12, and the setting of a gear position for pre-shifting is allowed.

When it is determined in step S14 that the process is in the shifting termination period, the clutch whose engagement capacity is gradually increasing (engage-side clutch) is made to be completely engaged, and the clutch whose engagement capacity is gradually decreasing (release-side clutch) is made to be completely released. The amount of heat generated in the engage-side clutch C1 or C2 (release-side clutch lubricating oil amount Q) is not enough to produce a pre-shifting-impeding drag torque in the release-side clutch in view of the released state of the release-side clutch C2 or C1 (Q≧Qs). Consequently, control advances to step S12, and the setting of a gear position for pre-shifting is allowed.

When it is determined in step S15 that the process is in the clutch switching period, the released clutch (engage-side clutch), which is one of the clutches C1 and C2, undergoes a gradual increase in engagement capacity from zero due to the progress of slip engagement that accompanies an increase in engagement oil pressure, and the engaged clutch (release-side clutch) is in a slip engagement control state in which the engagement capacity is gradually reduced by lowering the engagement oil pressure. The aforementioned pre-shifting is difficult to accomplish due to an interlocking trend wherein the gear shift stage group of the clutch C1 and C2 assumes a transmitting state via the slip engagement of the clutch C1 and C2. Control therefore unconditionally proceeds to step S16, and the setting of a gear position for pre-shifting is inhibited.

The clutches C1 and C2 thus both have engagement capacity, and the twin clutch-type automatic transmission 2 is in an interlocking trend. As a result, pre-shifting is inhibited when such pre-shifting is difficult to accomplish. It is thereby made possible to avoid adverse effects whereby pre-shifting is forced in a state in which the interlocking trend is established, that is, adverse effects whereby the related synchronous meshing mechanism is damaged.

When it is determined in step S15 that the process is in an inertial phase period, a check is made as to whether the current shifting is shifting with an early inertial phase, based on whether or not the inertial phase has occurred prior to the switching of the clutches C1 and C2 in step S17. Consequently, step S17 corresponds to the early inertial phase shifting analyzing section in the illustrated embodiment.

In addition, the inertial phase is performed upon establishment of a released state in which switching of the clutches C1 and C2 is completed and the release-side clutch C 1 or C2 does not have an engagement capacity any longer. Step S15 therefore corresponds to the clutch release detection section in the illustrated embodiment.

An inertial phase (with the degree of progress thereof being determined from the change in the input rotational speed of the transmission as described above) is normally produced along with switching of the clutches C1 and C2, and is therefore started after the clutches C1 and C2 have been switched (after the release-side clutch has been released).

However, when downshifting occurs despite the gas pedal being depressed in a high-torque state generated along with the depression of the accelerator pedal, the input rotational speed of the transmission first changes, the inertial phase is then produced prior to switching of the clutch C1 and C2, and shifting with an early inertial phase occurs.

Regardless of whether shifting with an early inertial phase occurs, during the inertial phase period, the inertial phase is caused to progress (the input rotational speed of the transmission is converted from the rotational speed prior to shifting to the rotational speed after shifting) by the slip engagement of one of the clutches C1 and C2 (the engage-side clutch). Therefore, as long as the operating parameters are maintained, the amount of heat generated (release-side clutch lubricating oil level Q) in the engage-side clutch C1 (C2) is sometimes at a level wherein a pre-shifting-impeding drag torque is produced in the release-side clutch C2 (C1) (Q≧Qs). In this case, control progresses to step S16, and the setting of a gear position for pre-shifting should be inhibited.

However, in the case of the aforementioned shifting with an early inertial phase (downshifting with the gas pedal depressed), the input rotational speed of the transmission is increased by the early occurrence of the inertial phase, and a large amount of heat is therefore generated (release-side clutch lubricating oil level Q) in the engage-side clutch C1 or C2 due to the inertial phase period. Even though high drag torque is generated by the released clutch on the pre-shift side (release-side clutch), the increase in synchronous load due to increased rotation of the synchronous meshing mechanism in conjunction with this drag torque is balanced out by the increase in the input rotational speed of the transmission due to the early occurrence of the inertial phase.

Consequently, in the case of shifting with an early inertial phase (downshifting with the gas pedal depressed), the amount of heat (release-side clutch lubricating oil amount Q) generated at the engage-side clutch C1 or C2 is large (Q≧Qs) due to the inertial phase period, and a large amount of drag torque is generated by the released clutch on the pre-shift side (release-side clutch), but the synchronous load of the related synchronous meshing mechanism does not increase greatly, and the above-described problems do not arise even when pre-shifting is performed.

In the example thus configured, when it is determined in step S17 that shifting with an early inertial phase (downshifting with the gas pedal depressed) is being performed, control progresses to step S12, and the setting of a gear position for pre-shifting is allowed in spite of the inertial phase period.

The present example is configured in this manner so that during shifting with an early inertial phase (downshifting with the gas pedal depressed), pre-shifting is allowed even in the inertial phase period, making it possible to avoid situations in which such pre-shifting is performed for the above-described reasons to prevent the aforementioned problems, but in which such pre-shifting is still unnecessarily inhibited and the shifting control is adversely affected.

Control progresses to step S18 and step S19 in cases in which it is determined in step S17 that shifting with an early inertial phase (downshifting with the gas pedal depressed) is not occurring, or in cases of shifting in which an inertial phase is generated after of the clutches C1 and C2 are switched.

In the illustrated embodiment, step S18 and step S19 correspond to a clutch oil level detection section. In step S18, a check is made regarding whether the acceleration aperture APO (input torque to the engage-side clutch C1 or C2) that represents the load condition of the engine 1 is at or above a preset aperture APOs (whether the input torque to the engage-side clutch C1 or C2 is high). In step S19, a check is made regarding whether the vehicle speed VSP (output rotational speed of the transmission) is at or above a preset vehicle speed VSPs.

The preset acceleration aperture APOs is taken as the lower limit of the large acceleration aperture range in which the input torque to the engage-side clutch C1 or C2 generates heat in the clutch (release-side clutch lubricating oil level Q) at a level wherein a pre-shifting-impeding drag torque is generated in the release-side clutch (Q≧Qs) in view of the released state of the release-side clutch. In addition, the preset vehicle speed VSPs is taken as the lower limit of the high vehicle speed range in which the rotational difference at the clutch input (slip amount) before and after the shifting of the engage-side clutch C1 or C2 causes the amount of heat generated (release-side clutch lubricating oil level Q) in the clutch to be at a level wherein a pre-shifting-impeding drag torque is generated in the release-side clutch (Q≧Qs).

When it is determined in step S18 that the acceleration aperture APO is at or above a preset aperture APOs, or when it is determined in step S19 that the vehicle speed VSP is at or above a preset vehicle speed VSPs; in other words, when the input torque of the engage-side clutch C1 or C2 or the rotational difference at the input of the engage-side clutch before and after shifting (slip amount) is at a level wherein the amount of heat generated in the clutch (release-side clutch lubricating oil level Q) is large enough (Q≧Qs) to produce a drag torque in the release-side clutch that is high enough to obstruct pre-shifting, then, in step S16, the setting of a gear position for pre-shifting is inhibited during the inertial phase period under the above-described conditions of an acceleration aperture of APO≧APOs, or a vehicle speed of VSP≧VSPs.

A configuration is thus produced in which the heat generation state at the engage-side clutch C1 or C2 is a state corresponding to a clutch lubricating oil level (Q≧Qs) at which a pre-shifting-impeding drag torque is generated in the release-side clutch, as described above. In this state, pre-shifting is prohibited in the inertial phase period at large acceleration apertures or high vehicle speeds. Consequently, pre-shifting is not forced when such pre-shifting is difficult or impossible to perform due to the high drag torque in the release-side clutch, making it possible to resolve problems in which the corresponding synchronous meshing mechanism is damaged and rendered less durable by such forced pre-shifting.

When the determination is made in step S18 that the acceleration aperture APO is less than a preset aperture APOs, and when the determination is made in step S19 that the vehicle speed VSP is below a preset vehicle speed VSPs; in other words, when the rotational difference at the input of the engage-side clutch C1 or C2 before and after shifting (slip amount) does not increase the heat generated by the clutch (release-side clutch lubricating oil level Q) enough to produce a pre-shifting-impeding drag torque in the release-side clutch (Q≧Qs), the setting of a gear position for pre-shifting is allowed in step S12 during the inertial phase period under the above-described acceleration aperture condition of APO<APOs and the vehicle speed condition of VSP<VSPs.

Thus, in accordance with this example, pre-shifting is allowed even during the inertial phase period of shifting when shifting with an early inertial phase (downshifting with the gas pedal depressed) is not occurring, provided that the acceleration aperture condition of APO<APOs and the vehicle speed condition of VSP<VSPs are both satisfied. It is thus possible to inhibit excessive pre-shifting and to avert detrimental influence on shifting control, even if the input torque of the engage-side clutch C1 or C2 or the rotational difference at the input of the engage-side clutch C1 or C2 before and after shifting (slip amount) is not large enough to make the amount of heat generated (release-side clutch lubricating oil level Q) in the clutch high enough (Q≧Qs) so that a pre-shifting-impeding drag torque is generated in the release-side clutch.

In addition, under the small acceleration aperture condition of APO<APOs and the low vehicle speed condition of VSP<VSPs, the predicted shift lines used when determining the target shift level during automatic shifting control are close to each other, and pre-shifting is inhibited in this range. When this occurs, shifting will not occur in time when auto-upshift is desired along with elevation of the vehicle speed VSP, and the shifting cannot be executed as required. In the present example, however, a configuration is employed in which pre-shifting is allowed under the small acceleration aperture condition of APO<APOs and the low vehicle speed condition of VSP<VSPs, whereby shifting can be executed as required during an auto-upshift request.

The preset acceleration aperture APOs and preset vehicle speed VSPs described above may be variables of the type that decrease with increasing temperature of the transmission operating oil. The reason for this is that, as the transmission operating oil temperature increases, it is necessary to increase the cooling capacity of lubricating oil by supplying a large quantity of the lubricating oil to the clutches C1 and C2 even when the same amount of heat is generated in the engage-side clutch. As the temperature increases, the acceleration aperture APO decreases and the vehicle speed VSP decreases, which causes the clutch lubricating oil level to reach a level at which a pre-shifting-impeding drag torque is generated in the release-side clutch. Consequently, as described above, the various actions and effects described above can be reliably produced at any transmission operating oil temperature by setting the preset acceleration aperture APOs and preset vehicle speed VSPs respectively so that they decrease as the transmission operating oil temperature increases.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A shifting control system comprising:
    a first gear shift stage group including a plurality of gear shift stages;
    a second gear shift stage group including a plurality of gear shift stages;
    a first clutch operatively coupled to the first gear shift stage group to selectively transmit power from an engine to a wheel;
    a second clutch operatively coupled to the second gear shift stage group to selectively transmit power from the engine to the wheel;
    a clutch release detection section configured to detect a release-side clutch which corresponds to one of the first and second clutches that is in a released state;
    a pre-shift controller arranged to operate a meshing mechanism of one of the first and second gear shift stage groups, which is to be connected to the engine by the release-side clutch, so as to undergo pre-shifting when the other of the first and second clutches is engaged as an engage-side clutch;
    a clutch oil level detection section configured to determine whether an oil level in the release-side clutch is equal to or greater than a preset oil level; and
    a pre-shift inhibiting section configured to inhibit pre-shifting while the oil level in the release-side clutch is equal to or greater than a preset oil level.

2. The shifting control system as set forth in claim 1, wherein
    the clutch oil level detection section sets the preset oil level to an amount of oil at which the release-side clutch generates a pre-shifting-impeding drag torque.

3. The shifting control system as set forth in claim 1, wherein
    the clutch oil level detection section uses a detection value of an oil level sensor for directly detecting an oil level in the release-side clutch.

4. The shifting control system as set forth in claim 1, wherein
    the clutch oil level detection section determines an oil level in the release-side clutch based on an oil supply level command value for at least one of the release-side clutch and the engage-side clutch.

5. The shifting control system as set forth in claim 1, wherein
    the clutch oil level detection section determines that, during an inertial phase in which a rotational speed on an input side of a transmission varies in conjunction with a shift in gears following a switching of an engagement state of the first and second clutches, the oil level in the release-side clutch is equal to or greater than the preset oil level at a time that a torque on an input side of the engage-side clutch is equal to or greater than to a preset torque.

6. The shifting control system as set forth in claim 5, wherein
    the clutch oil level detection section is further arranged to determine that the oil level in the release-side clutch is equal to or greater than the preset oil level at the time that the rotational speed on the output side of the transmission is equal to or greater than a preset rotational speed during an inertial phase following switching between the first and second clutches.

7. The shifting control system as set forth in claim 5, wherein
    the clutch oil level detection section determines that the oil level in the release-side clutch is less than the preset oil level at the time that the torque on the input side of the engage-side clutch is less than the preset torque, and that a rotational speed on an output side of the transmission is less than a preset rotational speed, during the inertial phase following switching between the first and second clutches.

8. The shifting control system as set forth in claim 5, wherein the preset torque related to the torque on the input side of the engage-side clutch, and a preset rotational speed related to a rotational speed on an output side of the transmission are set so as to decrease with increased temperature of hydraulic oil in the transmission.

9. The shifting control system as set forth in claim 1, wherein the clutch oil level detection section determines that an oil level in the release-side clutch is equal to or greater than the preset oil level during a starting slip control of the release-side clutch provided for a starting gear shift stage.

10. The shifting control system as set forth in claim 1, wherein an early inertial phase shifting analyzing section determines that shifting with an early inertial phase, which is a phase in which a rotational speed on an input side of the transmission varies in conjunction with a shift in gears, occurs before the first and second clutches are switched; and the pre-shift inhibiting section being further configured not to inhibit the pre-shifting, irrespective of detection results of the clutch oil level detection section, when a determination is made by the early inertial phase shifting analyzing section that shifting with the early inertial phase has occurred.

* * * * *